(12) United States Patent
Lee et al.

(10) Patent No.: US 8,769,570 B2
(45) Date of Patent: Jul. 1, 2014

(54) METHOD OF PROCESSING APPLICATION IN DIGITAL BROADCAST RECEIVER CONNECTED WITH INTERACTIVE NETWORK AND THE DIGITAL BROADCAST RECEIVER

(75) Inventors: Joon Hui Lee, Seoul (KR); Hyeon Jae Lee, Seoul (KR); Ho Taek Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 613 days.

(21) Appl. No.: 12/758,286

(22) Filed: Apr. 12, 2010

(65) Prior Publication Data

US 2011/0167468 A1     Jul. 7, 2011

Related U.S. Application Data

(60) Provisional application No. 61/292,867, filed on Jan. 7, 2010.

(51) Int. Cl.
| | |
|---|---|
| *G06F 3/00* | (2006.01) |
| *G06F 13/00* | (2006.01) |
| *H04N 5/445* | (2011.01) |
| *H04N 7/16* | (2011.01) |
| *H04N 11/00* | (2006.01) |
| *H04N 5/44* | (2011.01) |

(52) U.S. Cl.
USPC ............... 725/38; 725/51; 725/59; 725/62; 348/468; 348/734

(58) Field of Classification Search
CPC ............ H04N 21/41407; H04N 20/57; H04N 21/4126; H04N 21/47
USPC ................... 725/62, 38, 51, 59; 348/734, 468
See application file for complete search history.

(56) References Cited

U.S. PATENT DOCUMENTS

| | | | |
|---|---|---|---|
| 2004/0203374 A1* | 10/2004 | Zilliacus ................ | 455/41.2 |
| 2005/0289592 A1 | 12/2005 | Vermola ................. | 725/45 |
| 2008/0263600 A1 | 10/2008 | Olague et al. .......... | 725/58 |

FOREIGN PATENT DOCUMENTS

| | | |
|---|---|---|
| CN | 1339918 A | 3/2002 |
| CN | 1984306 A | 6/2007 |

(Continued)

OTHER PUBLICATIONS

Aislan G Foina et al: "How a cell phone can change dramatically the way we watch tv", EUROCON 2009, EUROCON '09. IEEE, IEEE, Piscataway, NJ, USA, May 18, 2009, pp. 1265-1271, XP031492018, ISBN: 978-1-244-3860-0.*
DVB Organization: DVB Digital Video Broadcasting; "Multimedia Home Platform" Revision 9.1; TAM232rc91.pdf:, c/o EBU-17A Ancienne Route-CH-1218 Grand Saconnex, Geneva, Switzerland; Oct. 3, 2003; pp. 1-162 (XP017818596).
"NorDig Rules of Operation for NorDig Unified Receiver Networks"; Oct. 28, 2004; <URL:http://www.nordig..org/pdf/NorDig-Rulesof_Operation_ver_1.0.pdf> [retrieved on Nov. 16, 2011]; pp. 1-29 (XP55012345).
Foina, Aislan G., et al.: "How a Cell Phone Can Change Dramatically the Way We Watch TV"; EUROCON 2009, IEEE, IEEE, Piscataway, New Jersey; May 18, 2009; pp. 1265-1271 (XP031492018).
European Search Report dated Feb. 14, 2012 issued in Application No. 10 00 3619.
Chinese Office Action dated Jan. 11, 2013 issued in Application No. 201010517301.3 (with English translation).

*Primary Examiner* — Pankaj Kumar
*Assistant Examiner* — Alazar Tilahun
(74) *Attorney, Agent, or Firm* — KED & Associates, LLP

(57) ABSTRACT

A digital broadcast receiver is disclosed. The method of processing an application in a digital broadcast receiver connected with an interactive network includes receiving, from a broadcast network, broadcast audio/video (A/V) content and application information table (AIT) data, wherein the AIT data includes a linkage descriptor, parsing the linkage descriptor, wherein the linkage descriptor comprises a field identifying a type of at least one secondary device able to process the application, displaying an indicator informing that the application is able to be accessed by using at least one secondary device, searching at least one secondary device connected to the digital broadcast receiver, receiving a request signal for the application, and transmitting the application or an IP address of the application to the secondary device.

9 Claims, 32 Drawing Sheets

(56) References Cited

FOREIGN PATENT DOCUMENTS

| CN | 101375260 A | 2/2009 |
|---|---|---|
| EP | 1 133 187 A1 | 9/2001 |
| EP | 1 267 579 A2 | 12/2002 |
| EP | 1 809 052 A1 | 7/2007 |
| EP | 1 876 810 A2 | 1/2008 |
| GB | 2 407 745 A | 5/2005 |
| WO | WO 01/89154 A1 | 11/2001 |
| WO | WO 2007/063380 A2 | 6/2007 |
| WO | WO 2009/007815 A2 | 1/2009 |

* cited by examiner

FIG. 3
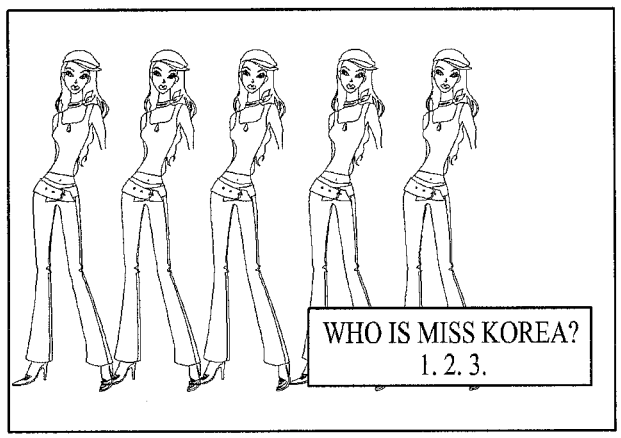
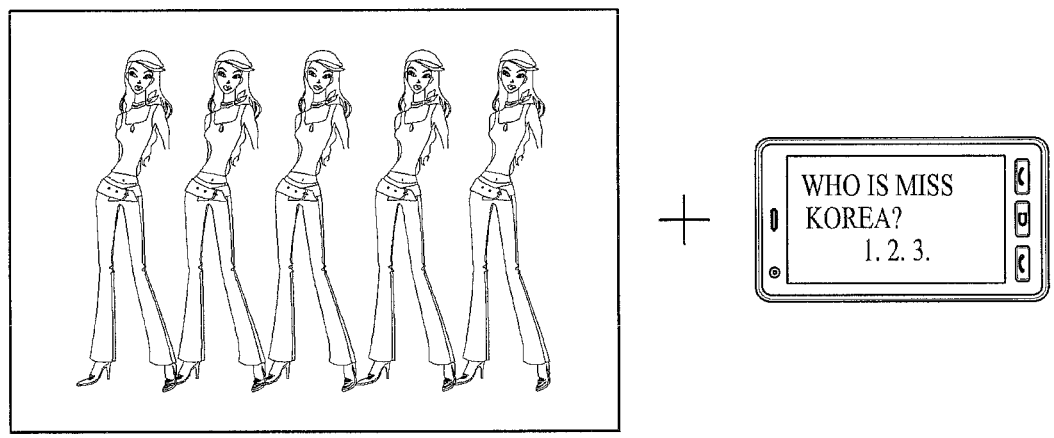

FIG. 4
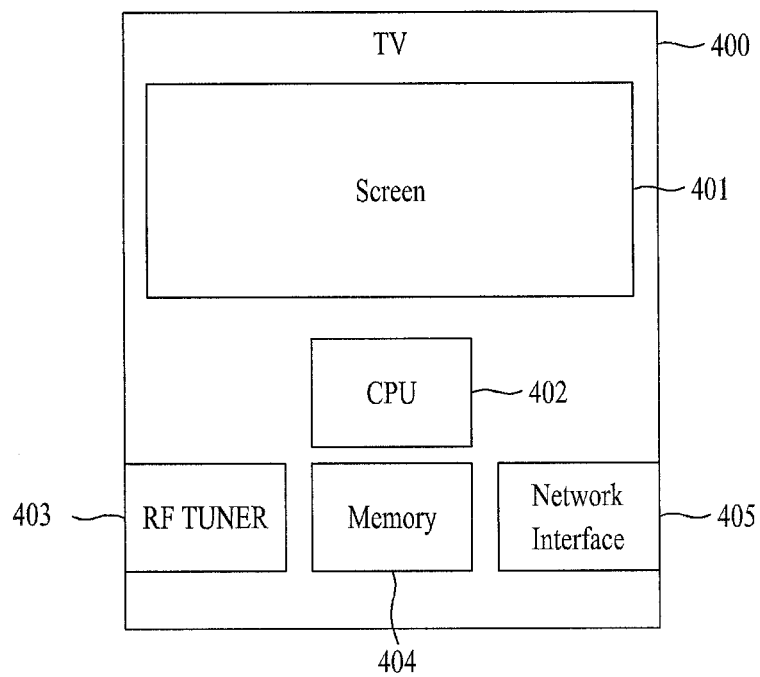
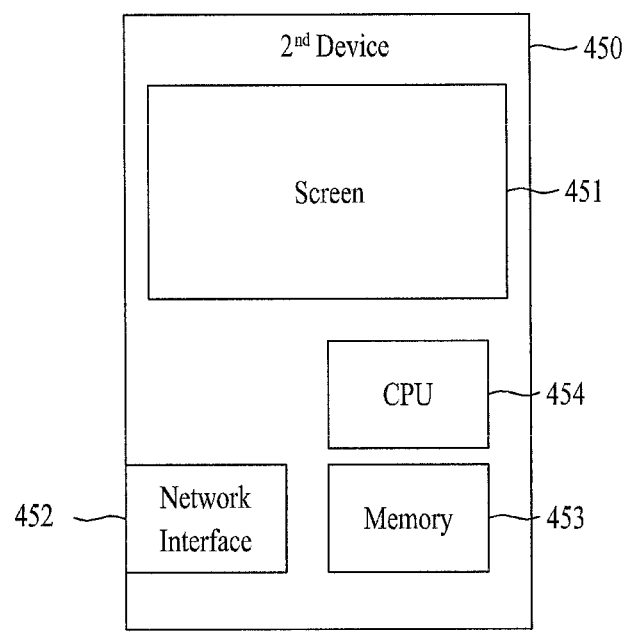

FIG. 8

|  | NO. of bits | indentifier |
|---|---|---|
| application_information_section(){ |  |  |
|    table_id | 8 | unimsbf |
|    section_syntax _indicator | 1 | bslbf |
|    reserved_future_use | 1 | bslbf |
|    reserved | 2 | bslbf |
|    section_length | 12 | unimsbf |
|    test_application_flag | 1 | bslbf |
|    application_type | 15 | unimsbf |
|    reserved | 2 | bslbf |
|    version_number | 5 | unimsbf |
|    current_next_indicator | 1 | bslbf |
|    section_number | 8 | unimsbf |
|    last_section_number | 8 | unimsbf |
|    reserved_future_use | 4 | bslbf |
|    common_descriptors_length | 12 | unimsbf |
|    for(i=0;i<n;i++){ |  |  |
|       descriptor() |  |  |
|    } |  |  |
|    reserved_future_use | 4 | bslbf |
|    application_loop_length | 12 | unimsbf |
|    for(i=0;i<n;i++){ |  |  |
|       application_identifier() |  |  |
|       application_control_code | 8 | unimsbf |
|       reserved_future_use | 4 | bslbf |
|       application_descriptors_loop_length | 12 | unimsbf |
|       for(i=0;i<n;i++){ |  |  |
|          descriptor() |  |  |
|       } |  |  |
|    } |  |  |
|    CRC_32 | 32 | rpchof |
| } |  |  |

FIG. 9

| Syntax | No. of bits | Format |
|---|---|---|
| application_linkage_descriptor(){ | | |
|   descriptor_tag | 8 | uimsbf |
|   descriptor_length | 8 | uimsbf |
|   linkage_type | 8 | uimsbf |
|   application_identifier() | 48 | uimsbf |
|   target_device_profile_loop_length | 8 | uimsbf |
|   for (i=0;i<N;i++) { | | uimsbf |
|     target_device_profile | 8 | uimsbf |
|   } | | uimsbf |
|   number_of_concurrent_instance | 8 | uimsbf |
|   application_location_type | 8 | uimsbf |
|   if (application_location_type == 0x02) { | | |
|     transport_stream_id | 16 | uimsbf |
|     original_network_id | 16 | uimsbf |
|     service_id | 16 | uimsbf |
|   } | | |
|   if (application_location_type == 0x03) { | | |
|     application_location_url_length | 8 | uimsbf |
|     for(j=0;j<N;j++) { | | |
|       application_location_url | 8 | bslbf |
|     } | | |
|   } | | |
| } | | |

FIG. 10

| Value | Meaning |
|---|---|
| 0x00 | Reserved |
| 0x01 | Application replacement application |
| 0x02 | Transferable application to other device |
| 0x03 to 0xFF | Reserved |

FIG. 11

|  | No. of bits |
|---|---|
| application_indentifier{ |  |
|     organisation_id | 32 |
|     application_id | 16 |
| } |  |

FIG. 12

| Value | Meaning |
|---|---|
| 0x00 | Reserved |
| 0x01 | Basic DTV profile (Text-based UI) |
| 0x02 | Medium DTV profile (Text+Image UI) |
| 0x03 | Advanced DTV profile (IP video streaming support) |
| 0x04 to 0x10 | Reserved |
| 0x11 | Mobile Handset |
| 0x12 | Mobile Handset with touch user interface |
| 0x13 | Smart Phone |
| 0x14 to 0xFF | Reserved |

FIG. 13

| Value | Meaning |
|---|---|
| 0x00 | Reserved |
| 0x01 | Same TS stream service resides in (same channel) |
| 0x02 | Other TS stream (other channel) |
| 0x03 | Interactive channel pointed by URL |
| 0x04 to 0xFF | Reserved |

FIG. 14
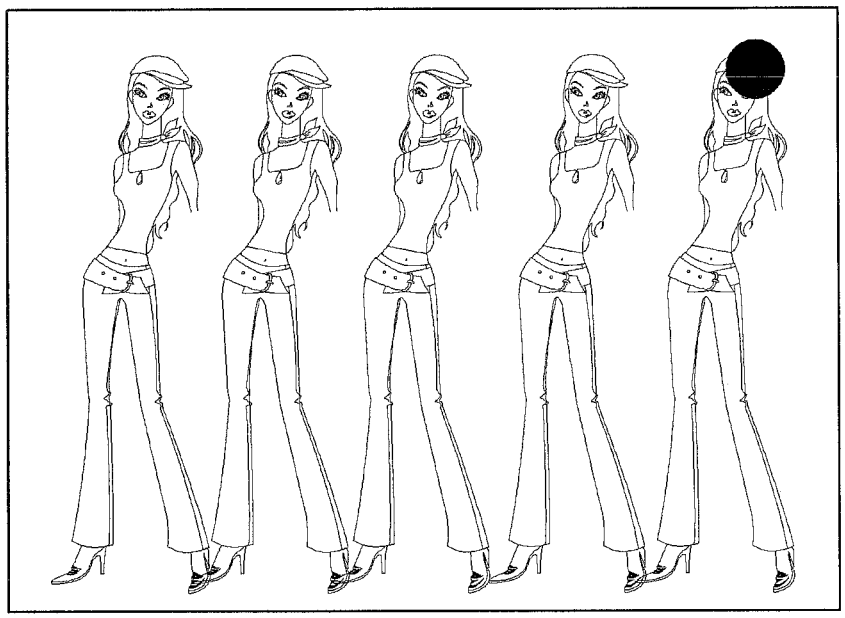
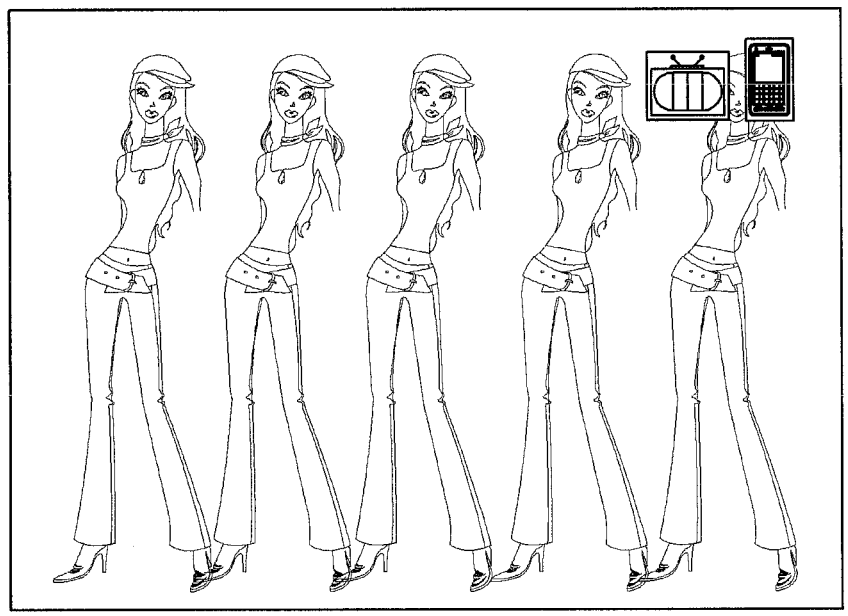

FIG. 29

| | Device List | |
|---|---|---|
| | REQUIRED TIME | SENSITIVITY |
| Device 1 | 0.5sec | HIGH |
| Device 2 | 1sec | MIDDLE |
| Device 3 | 0.7sec | LOW |

Search   Select   Register

FIG. 32

|  | Application 1 | Application 2 | Application 3 |
|---|---|---|---|
| Device 1 | ○ | × | × |
| Device 2 | × | ○ | × |
| Device 3 | × | × | ○ |

METHOD OF PROCESSING APPLICATION IN DIGITAL BROADCAST RECEIVER CONNECTED WITH INTERACTIVE NETWORK AND THE DIGITAL BROADCAST RECEIVER

Pursuant to 35 U.S.C. §119(a), this application claims the benefit of earlier filing date and right of priority to U.S. Provisional Application No. 61/292,867, filed on Jan. 7, 2010, the contents of which are hereby incorporated by reference herein in their entirety.

DETAILED DESCRIPTION OF THE INVENTION

1. Technical Field

The present invention relates to a digital broadcast receiver, and more particularly, to a method of processing an application in a digital broadcast receiver connected with an interactive network.

2. Background Art

Recently, Internet Protocol Television (IPTV) or bidirectional TV having bidirectional characteristics has been discussed. However, a protocol for processing broadcast audio/video (A/V) content and at least one application at different devices is not defined.

DESCRIPTION OF THE INVENTION

Technical Problem

An object of the present invention devised to solve the problem lies on a method of processing a plurality of applications at different devices.

Another object of the present invention devised to solve the problem lies on solving a problem that visibility of broadcast A/V content deteriorates due to at least one application provided by a bidirectional TV system.

Technical Solutions

The object of the present invention can be achieved by providing a control method including: receiving, from a broadcast network, broadcast audio/video (A/V) content and application information table (AIT) data, wherein the AIT data includes a linkage descriptor, parsing the linkage descriptor, wherein the linkage descriptor comprises a field identifying a type of at least one secondary device able to process the application, displaying an indicator informing that the application is able to be accessed by using at least one secondary device, searching at least one secondary device connected to the digital broadcast receiver, receiving a request signal for the application, and transmitting the application or an IP address of the application to the secondary device.

Advantageous Effects

According to one embodiment of the present invention, a method of processing a plurality of applications at different devices is provided.

According to another embodiment of the present invention, a problem that visibility of broadcast A/V content deteriorates due to at least one application provided by a bidirectional TV system is solved.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 3 is a diagram showing a screen displayed according to an embodiment of the present invention.

FIG. 4 is a schematic diagram showing a digital broadcast receiver according to an embodiment of the present invention and a secondary device according to an embodiment of the present invention.

FIG. 8 is a diagram showing the syntax of an Application Information Table (AIT) according to an embodiment of the present invention.

FIG. 9 is a diagram showing a linkage descriptor according to an embodiment of the present invention added to the AIT shown in FIG. 8.

FIG. 10 is a diagram illustrating a linkage type field in the descriptor shown in FIG. 9 in detail.

FIG. 11 is a diagram illustrating an application identifier field in the descriptor shown in FIG. 9 in detail.

FIG. 12 is a diagram illustrating a target device profile field in the descriptor shown in FIG. 9.

FIG. 13 is a diagram illustrating an application location type field in the descriptor shown in FIG. 9.

FIG. 14 is a diagram illustrating step S504 of FIG. 5 and step S605 of FIG. 6 in detail.

FIG. 29 is a diagram showing an example of a UI displayed in a process of implementing another embodiment of the present invention shown in FIG. 28.

FIG. 32 is a diagram showing another example of a UI displayed in a process of implementing another embodiment of the present invention shown in FIG. 28.

BEST MODE FOR CARRYING OUT THE INVENTION

Reference will now be made in detail to the preferred embodiments of the present invention, examples of which are illustrated in the accompanying drawings.

Meanings of terms used herein should be determined in consideration of functionality of the present invention, and it may be variable depending on user's or operator's intention, or customs in the art. In addition, some of the terms mentioned in the description of the present invention, the detailed meanings of which are described in relevant parts of the description herein, have been selected at the discretion of the applicant. Furthermore, the present invention must be understood, not simply by the actual terms used but by the meanings of each term lying within.

Recently, as broadcast technology has been developed, technology of transmitting not only an audio/video broadcast program but also an application linked with the A/V broadcast program has been discussed. Accordingly, the A/V broadcast program and the application may be simultaneously displayed on a screen.

However, in such a design, the broadcast A/V content may be partially covered with the application. Even when a TV user wants to view the entire screen of the broadcast A/V content, the needs of the user may not be satisfied due to the application.

More particularly, if the application is made according not to a broadcast provider's intention but to a third party's intention, conflicts between the broadcast provider and the third party may be caused.

Figure 1:
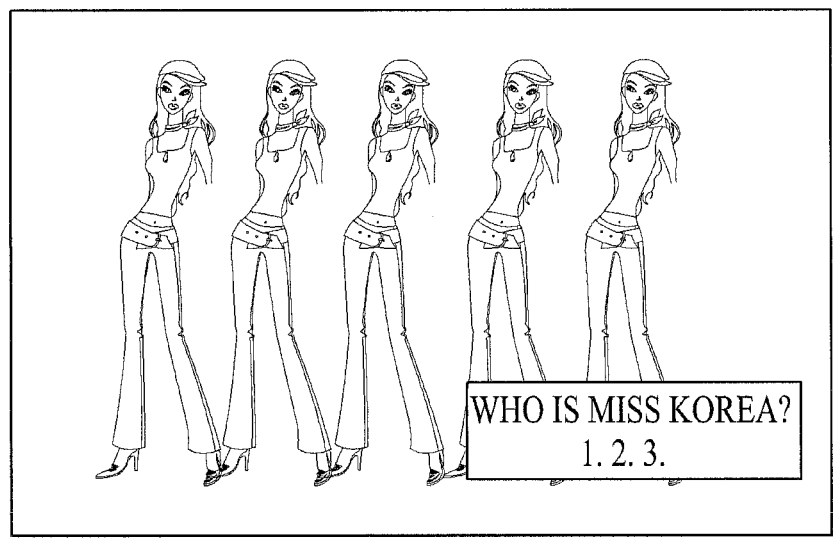
FIG. 1 is a diagram showing an example of a reference drawing illustrating an embodiment of the present invention.

FIG. 1 is a diagram showing an example of a reference drawing illustrating an embodiment of the present invention. FIG. 1 shows an example of a Miss Korea Pageant broadcast, in which an application for recommending polling to users is simultaneously displayed. However, in the case of the design shown in FIG. 1, a screen of original broadcast A/V content is partially covered, causing user dissatisfaction.

Figure 2:
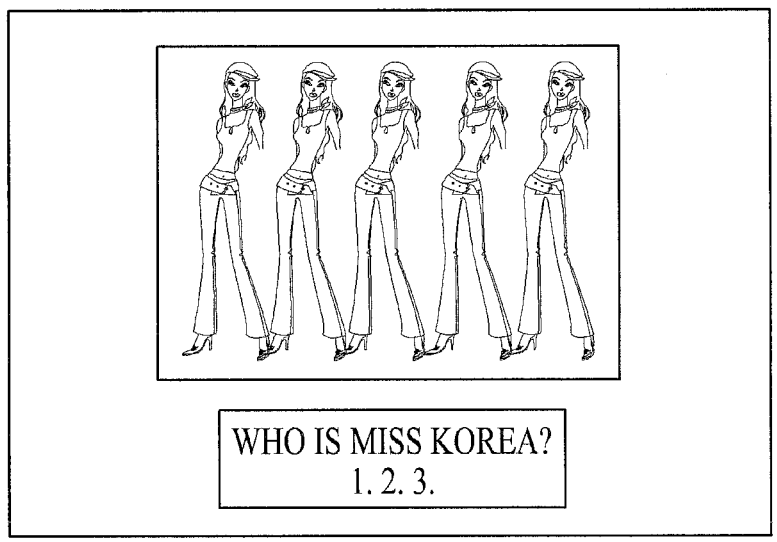
FIG. 2 is a diagram showing another example of a reference drawing illustrating an embodiment of the present invention.

FIG. 2 is a diagram showing another example of a reference drawing illustrating an embodiment of the present invention. In order to solve the problem of FIG. 1, a method of reducing a screen of original A/V content and displaying the reduced screen may be used as shown in FIG. 2. However, even in the case of the design shown in FIG. 2, a problem that the entire screen is reduced occurs. In addition, screen flickering or resolution deterioration may occur in a process of reducing the scale of an original image.

Accordingly, in one embodiment of the present invention, when a secondary device (e.g., a mobile phone or the like) connected to a TV receiver having a network function over a network is present, application data is transmitted to the secondary device such that dissatisfaction of the users is solved and conflicts between the broadcast provider and the third party are prevented.

Further, one embodiment of the present invention suggests a method of automatically establishing a network connection between a TV receiver having a network function and a secondary device.

In addition, one embodiment of the present invention suggests a method of transmitting an application received by a TV receiver having a network function to a secondary device. In addition, one embodiment of the present invention suggests a method of determining whether a secondary device or a TV receiver uses an application. Hereinafter, the embodiments of the present invention will be described in detail.

FIG. 3 is a diagram showing a screen displayed according to an embodiment of the present invention. As shown in FIG. 3, according to one embodiment of the present invention, broadcast A/V content is displayed on a screen of a digital broadcast receiver and an application linked with the broadcast A/V content is displayed on a screen of a secondary device such as a mobile phone. Accordingly, user convenience and visibility of each screen are secured.

FIG. 4 is a schematic diagram showing a digital broadcast receiver according to an embodiment of the present invention and a secondary device according to an embodiment of the present invention.

As shown in FIG. 4, the digital broadcast receiver according to the embodiment of the present invention includes a Radio Frequency (RF) tuner 403, a memory 404, a network interface 405, a Central Processing Unit (CPU) 402, and a screen 401. In addition, the secondary device 450 according to the embodiment of the present invention includes a network interface 452, a memory 453, a CPU 454, and a screen 451.

The digital broadcast receiver 400 and the secondary device 450 respectively include the network interfaces 405 and 452 and transmit a signal to each other through the interfaces. As a signal transmission/reception method, for example, wireless technology such as 802.11a/b/g or Bluetooth or wired technology such as 802.3 may be used.

The digital broadcast receiver 400 receives broadcast A/V content or an application using the RF tuner 403 or the network interface 405.

In order to drive network middleware for connecting the digital broadcast receiver 400 and the secondary device 450 to each other over the network, the digital broadcast receiver 400 and the secondary device 450 include the CPUs 402 and 454 and the memories 404 and 453, respectively. The secondary device 450 may further include an IR transmitter and a User Interface (UI) module for controlling the digital broadcast receiver 400.

It is assumed that the above-described network middleware is Universal Plug & Play (UPnP) and the secondary device is a mobile phone. The scope of the present invention is not limited to the embodiments of the present invention and is defined by the appended claims.

As described above, the digital broadcast receiver and the mobile phone have a network function and are UPnP compatible devices. It is assumed that the network function of the digital broadcast receiver is always turned on and the network function of the mobile phone may be in an ON state or an OFF state. It is assumed that the mobile phone has a display function.

Figure 5:
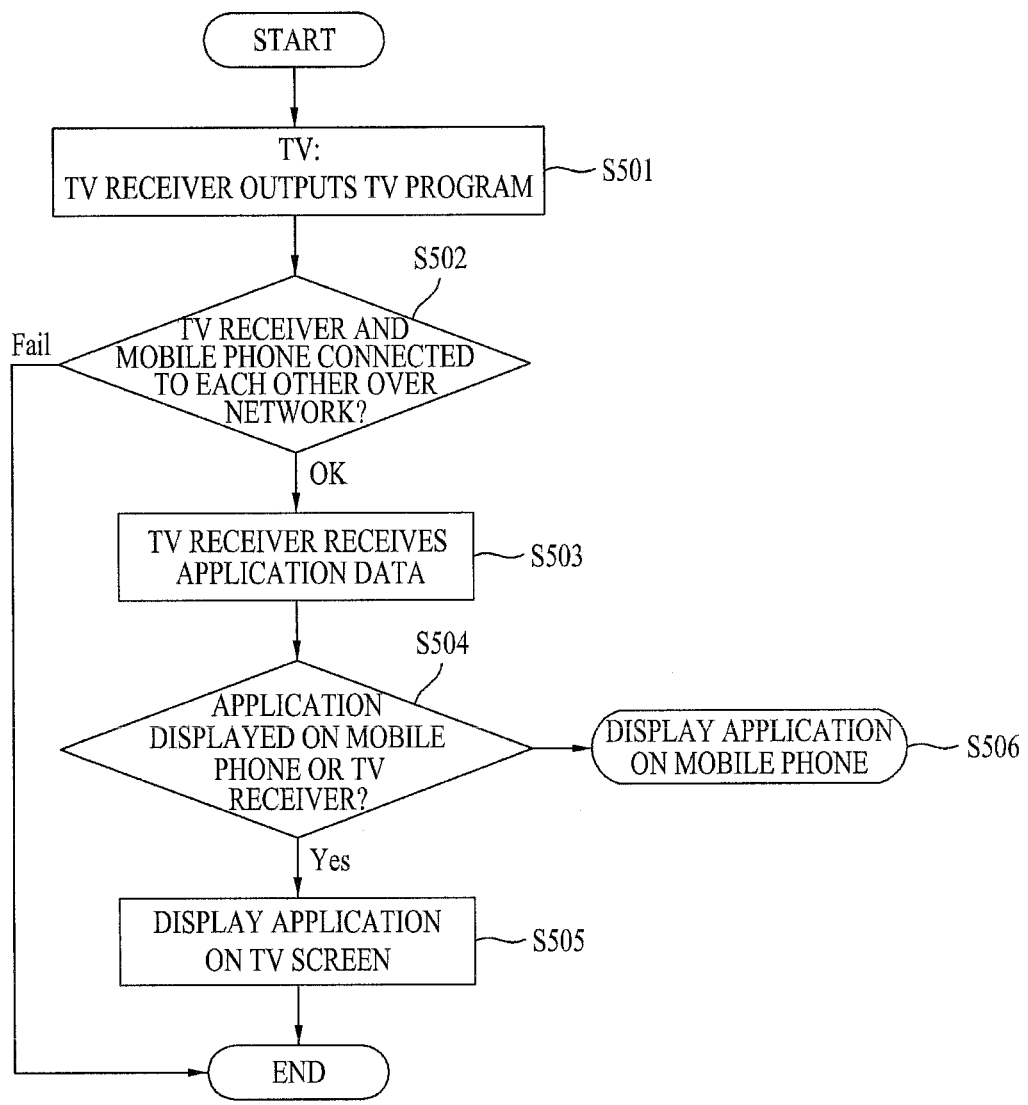
FIG. 5 is a flowchart illustrating a control method according to an embodiment of the present invention.

FIG. 5 is a flowchart illustrating a control method according to an embodiment of the present invention. FIG. 5 shows a process of automatically establishing a UPnP-connection between a digital broadcast receiver and a mobile phone if the mobile phone is located within a home network range of the digital broadcast receiver in the case where a UPnP function of the mobile phone is always turned on.

The digital broadcast receiver according to the embodiment of the present invention outputs broadcast A/V content (S501). Then, it is determined whether the digital broadcast receiver and the mobile phone are connected to each other over a network (S502). Then, the digital broadcast receiver receives application data (S503).

A UI for inquiring about whether the application data is output from the digital broadcast receiver or the mobile phone is displayed (S504). If it is confirmed that the application data is output from the mobile phone, the application is displayed on the mobile phone (S505). In contrast, if it is confirmed that the application data is output from the digital broadcast receiver (e.g., a TV receiver), the application is displayed on the digital broadcast receiver (S506).

Figure 6:
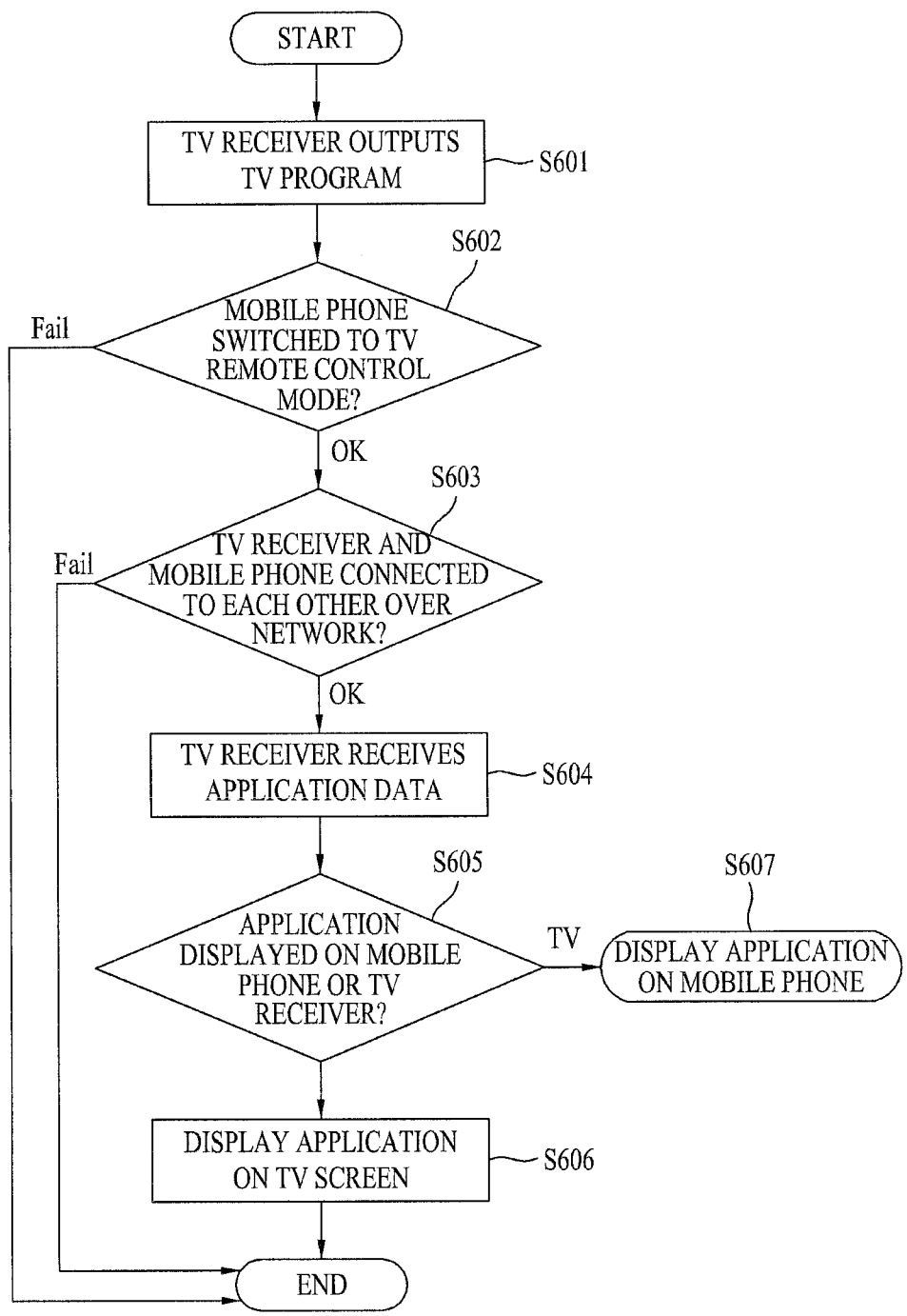
FIG. 6 is a flowchart illustrating a control method according to another embodiment of the present invention.

FIG. 6 is a flowchart illustrating a control method according to another embodiment of the present invention. FIG. 6 shows the case where a UPnP connection between a digital broadcast receiver and a mobile phone is established if a UPnP function of the mobile phone is turned off and the mobile phone is switched to a "TV remote control mode".

The digital broadcast receiver according to one embodiment of the present invention outputs broadcast A/V content (S601). Then, determination as to whether or not the mobile phone is switched to the TV remote control mode is made (S602). In step S602, for example, determination as to whether or not the mobile phone desires to switch the TV state (power off/on), volume adjustment or channel change may be made.

Determination as to whether or not the digital broadcast receiver and the mobile phone are connected over a network is made (S603). The digital broadcast receiver receives application data (S604).

Further, a UI for inquiring about whether the application is output from the digital broadcast receiver or the mobile phone is displayed (S605). If it is confirmed that the application data is output from the mobile phone, the application is displayed on the mobile phone (S606). In contrast, if it is confirmed that the application data is output from the digital broadcast receiver (e.g., a TV receiver), the application is displayed on the digital broadcast receiver (S607).

Figure 7:
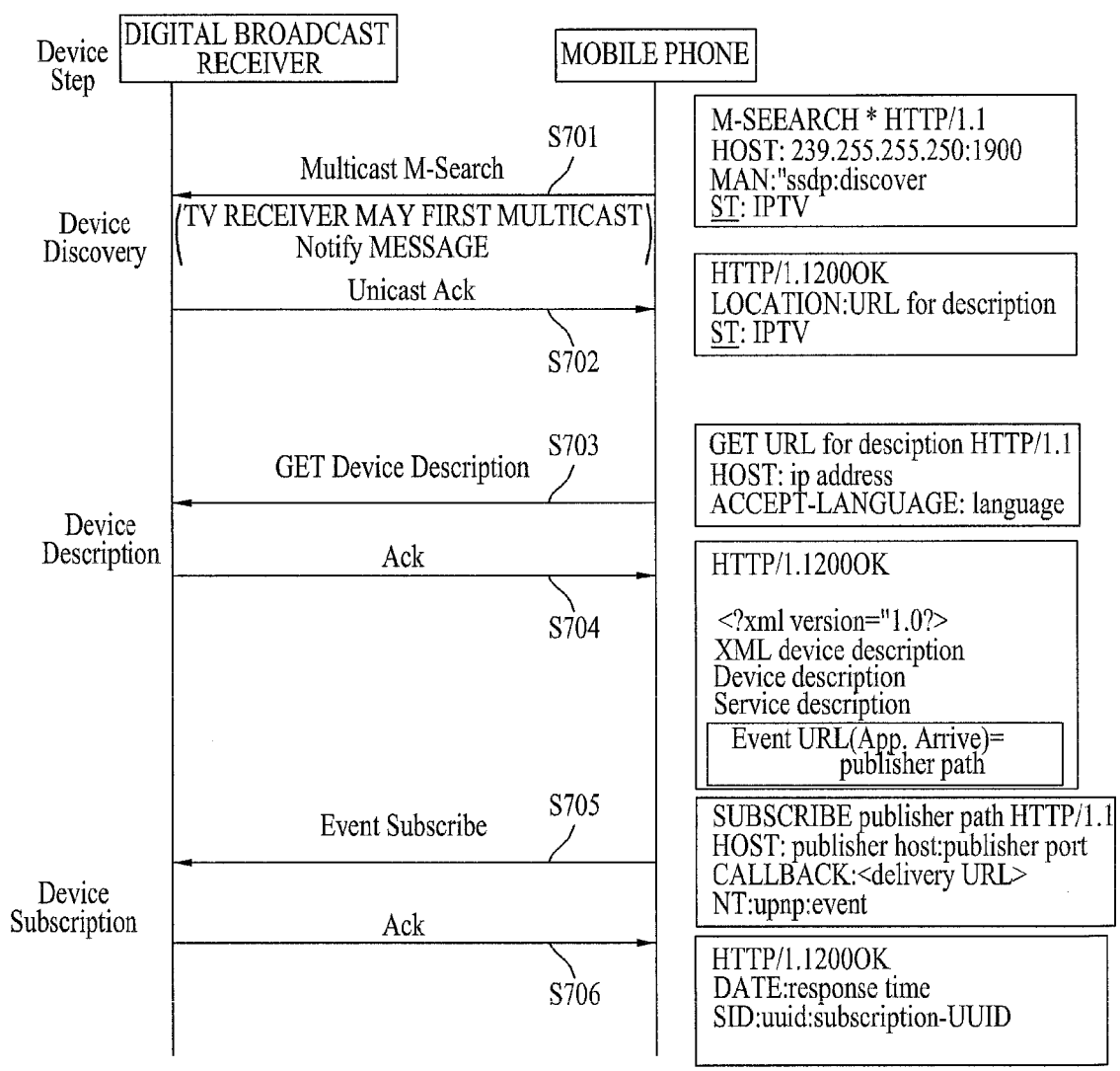
FIG. 7 is a flowchart illustrating step S502 of FIG. 5 and step S603 of FIG. 6 in detail.

FIG. 7 is a flowchart illustrating step S502 of FIG. 5 and step S603 of FIG. 6 in detail. As shown in FIG. 7, signal flow between the digital broadcast receiver and the secondary device (e.g., the mobile phone) is performed according to, for example, UPnP. In the UPnP protocol, the digital broadcast receiver may function as a device and the mobile phone may function as a Control Point (CP). In addition, an example of a message used in each step is shown on the right portion of FIG. 7.

The mobile phone transmits a "Multicast M-Search" message to the digital broadcast receiver (S701). Alternatively, the digital broadcast receiver may first multicast a "notify" message. The digital broadcast receiver transmits a "unicast ack" message to the mobile phone (S702).

The mobile phone transmits a "GET Device Description" message to the digital broadcast receiver (S703). The digital broadcast receiver transmits an "Ack" message to the mobile phone (S704).

The mobile phone transmits an "Event Subscribe" message to the digital broadcast receiver (S705). The digital broadcast receiver transmits an "Ack" message to the mobile phone (S706). If steps S705 and S706 are completed, the network connection between the digital broadcast receiver and the mobile phone is established.

Meanwhile, an "App. Arrive Event" may be added to a UPnP Description message so as to notify the mobile phone of application data arrival when application data arrives at the digital broadcast receiver.

In the network connection process between the digital broadcast receiver and the mobile phone, information about a device profile and capabilities of the mobile phone may be transmitted to the digital broadcast receiver. In this case, an application suitable for the mobile phone may be selected using the information.

Further, as the secondary device, a Personal Computer (PC) may be used instead of the mobile phone. The secondary devices may transmit information about the devices to the digital broadcast receiver or transmit representative images linked with the devices, or the user may directly specify images of the devices. Such images are displayed when the digital broadcast receiver receives an accessible application. If a displayed image is selected, an application is transferred to and displayed on a device corresponding to the selected image.

Applications executable in a current channel or service may be signaled through an Application Information Table (AIT). The digital broadcast receiver parses the AIT and checks executable applications. This process will now be described in detail.

The digital broadcast receiver according to one embodiment of the present invention tunes to a new broadcast channel according to user selection. The digital broadcast receiver receives AIT data in the tuned channel. The digital broadcast receiver parses the AIT data and checks accessible applications using the AIT data. If a plurality of applications is provided, the applications are aligned according to a control code, application priority or the like of the AIT are aligned according to an application usage descriptor or the like. In addition, an application list for displaying the aligned applications is generated.

Accordingly, the digital broadcast receiver determines whether or not an application included in the list is used in the digital broadcast receiver or the secondary device, based on the generated application list. At this time, an executable device may be changed according to applications. For example, a first application may operate only in the digital broadcast receiver and a second application may operate only in the mobile phone with low resolution.

In order to newly define a complicated signaling relationship, in one embodiment of the present invention, a descriptor of FIG. 9 is defined. This will be described in detail with reference to FIGS. 8 and 9.

FIG. 8 is a diagram showing the syntax of an AIT according to an embodiment of the present invention. In order to signal an application transmitted in a state of being included in a digital broadcast channel service, AIT data shown in FIG. 8 may be used. One piece of AIT data shown in FIG. 8 may be transmitted per service, and the AIT data includes information about all applications available in a service.

As shown in FIG. 8, for example, AIT data includes a common loop (outer loop) including a descriptor commonly applied to all applications and an application loop (inner loop) individually applied to each application.

The above-described application is identified by an application identifier and a control code is used to control the state of the application. The fields of the AIT data shown in FIG. 8 are described in brief.

table_id—This 8 bit integer with value 0x74 identifies this table.

section_syntax_indicator—The section_syntax_indicator is a 1-bit field which shall be set to "1".

section_length—This is a 12-bit field, the first two bits of which shall be "00". The remaining 10 bits specify the number of bytes of the section starting immediately following the section_length field, and including the CRC_32. The value of this field shall not exceed 1021 (0x3FD).

test_application_flag—This 1-bit field, when set, indicates an application which is transmitted for the purposes of receiver testing and which shall not be started or listed in any API or displayed in any user interface by receivers under normal operational conditions. The means (if any) by which a receiver is put into a mode where applications signaled with this bit set are treated as if this field is set to zero is implementation dependent but should not be one which typical end-users might discover on their own.

application_type—This is a 15-bit field which identifies the type of the applications described in this AIT sub_table.

version_number—This 5-bit field is the version number of the sub_table. The version_number shall be incremented by 1 when a change in the information carried within the sub_table occurs. When the version_number reaches a value of "31", it wraps around to "0".

current_next_indicator—This 1-bit indicator shall be set to "1".

section_number—This 8-bit field gives the number of the section. The section_number of the first section in the sub_table shall be "0x00". The section_number shall be incremented by 1 with each additional section with the same table_id, and application_type.

last_section_number—This 8-bit field specifies the number of the last section (that is, the section with the highest section_number) of the sub_table of which this section is part.

common_descriptors_length—This 12-bit field gives the total length in bytes of the following descriptors. The descriptors in this descriptor loop apply to all of the applications contained in this AIT sub_table.

application_control_code—This 8-bit field controls the state of the application. The semantics of this field are application type dependant.

application_loop_length—This 12-bit field gives the total length in bytes of the following loop containing application information.

application_identifier( )—This 48 bit field identifies the application.

application_descriptors_loop_length—This 12-bit field gives the total length in bytes of the following descriptors. The descriptors in this loop apply to the specific application.

CRC_32—This is a 32-bit field that contains the CRC value that gives a zero output of the registers in the decoder.

FIG. 9 is a diagram showing a linkage descriptor according to an embodiment of the present invention added to the AIT shown in FIG. 8. FIG. 9 may be included in an application descriptor loop of the AIT shown in FIG. 8, and information about another application linked with an application is signaled. The meanings of the fields are as follows.

A "linkage_type" field indicates a relationship between linked applications. The values of this field are shown in FIG. 10. If the value of the "linkage_type" field is "0x01", this indicates an application with which another application is replaceable. This indicates a relationship between applications, in consideration of the fact that several versions of one application are made according to device types so as to be transmitted. For example, in the case where a news application including three applications, that is, an application including only text, an application including text and images, and an application including text, images and moving pictures, is generated, these applications are selectively used according to the capabilities of a device. The field values of these applications are 0x01.

In contrast, if the value of the field is 0x02, it is indicated that an application is transferable to other devices so as to be executed. In such a design, it is indicated that one application can operate in various types of devices.

An "application_identifier( )" field is information for uniquely identifying an application. As shown in FIG. 11, this information includes a 32-bit service provider ID and a 16-bit application ID provided by a service provider. This is only an exemplary embodiment and other embodiments are possible.

A "target_device_profile_loop_length" field indicates the length of a target_device_profile loop immediately following this field.

A "target_device_profile" field indicates devices able to execute an application. The number of devices able to execute the application may be one or more, and a plurality of devices may be specified using the loop shown in FIG. 9. An example of the field value is shown in FIG. 12.

In FIG. 12, profiles corresponding to 0x01 to 0x03 correspond to digital broadcast receivers. More particularly, profiles of a basic digital broadcast receiver for supporting only a text-based UI, a middle-level digital broadcast receiver for supporting text and images, and a top-level digital broadcast receiver able to process, for example, IP-based video streaming are included.

In FIG. 12, profiles corresponding to 0x11 to 0x13 correspond to secondary devices. More particularly, a profile (0x11) of a general mobile phone including a keypad, a profile (0x12) of a mobile phone having a touch screen function, and a profile (0x13) of a mobile phone having a smart function are included. For example, the smart phone can support a touchscreen-based UI and a virtual or physical keyboard. Accordingly, an application different from that of a general mobile phone is processed.

That is, using the "target_device_profile" field, an application suitable for a device which is currently connected to the digital broadcast receiver may be extracted.

A "number_of_concurrent_instance" field defines the number of secondary devices for simultaneously processing an application. If the value of this field is 1, for example, only one device can process the application. Accordingly, in the case where the digital broadcast receiver executes the application and then the application is transmitted to and executed on the secondary device, the application processed by the digital broadcast receiver is forcibly completed. In contrast, if the value of this field is 0, an unlimited number of devices may simultaneously execute the application. In addition, if the value of this field is 2 or more, a set number of devices may simultaneously execute the application.

An "application_location_type" field defines the type of a location able to receive the application. Examples of the value of this field are shown in FIG. 13. The application may be transmitted in a state of being included in the same TS stream as currently displayed broadcast A/V content (0x01) or may be transmitted through another TS stream (0x02). If the application is transmitted through the other TS stream, information about the other TS stream is specified through dvbtriplet. Further, if the value of this field is 0x03, the application is received through an interactive channel and a URL linked therewith is specified. The digital broadcast receiver receives the application at the location specified by the URL. Meanwhile, the location may be a web page specified by an HTTP protocol or an address of a WAP application available in the mobile phone.

An "application_location_url_length" field specifies the length of an "application_location_url" following this field.

An "application_location_url" field defines the URL able to receive the application if the value of the "application_location_type" field is 0x03.

FIG. 14 is a diagram illustrating step S504 of FIG. 5 and step S605 of FIG. 6 in detail. FIG. 14 shows a screen in which the digital broadcast receiver which receives the application selects whether the received application is displayed on the receiver or the secondary device.

If the digital broadcast receiver and the mobile phone are not connected over the network, an application data arrival notification is displayed on the left portion of FIG. 14.

In contrast, if the digital broadcast receiver and the mobile phone are connected over the network, a mobile phone-associated icon and a TV-associated icon are simultaneously displayed on the screen of the digital broadcast receiver as shown on the right portion of FIG. 14. If the mobile phone-associated icon is selected, the application is transmitted to and executed on the mobile phone.

Figure 15:
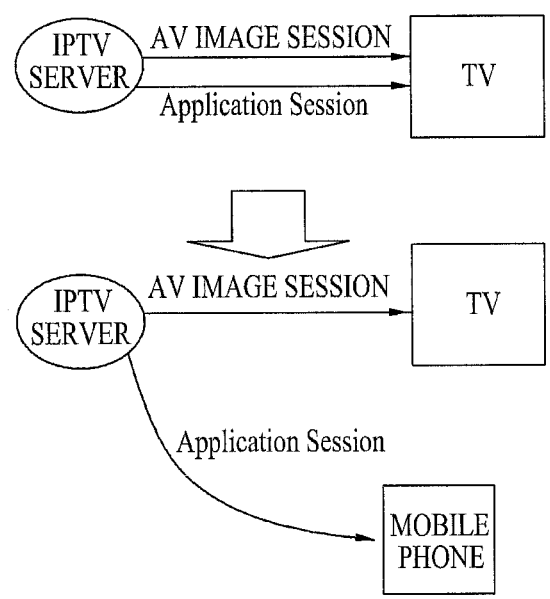
FIG. 15 is a diagram illustrating the case where both broadcast A/V content and an application are transmitted over an IP network.
Figure 16:
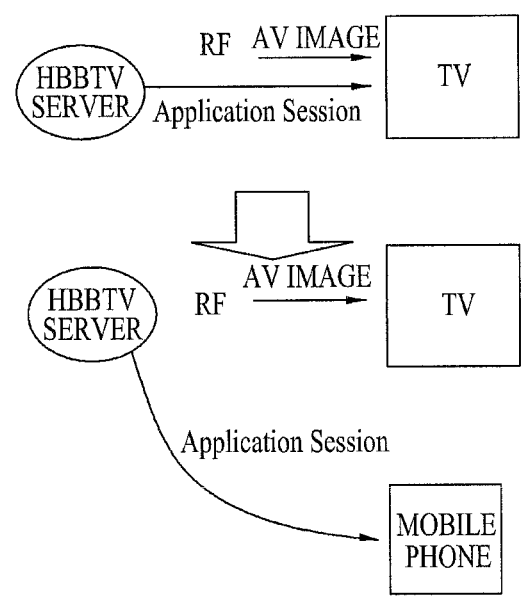
FIG. 16 is a diagram illustrating the case where broadcast A/V content is transmitted over a Radio Frequency (RF) network and an application is transmitted over an IP network.

FIG. 15 is a diagram illustrating the case where both broadcast A/V content and an application are transmitted over an IP network. FIG. 16 is a diagram illustrating the case where broadcast A/V content is transmitted over a Radio Frequency (RF) network and an application is transmitted over an IP network.

Application session URL information is transmitted in a state of being carried in System Information (SI) such as an AIT multiplexed in the broadcast A/V content, in the case of a terrestrial broadcast. In contrast, the application session URL information is transmitted through Service Discovery and selection (SD&S) Electronic Program Guide (EPG) Metadata, in the case of an IPTV broadcast.

In the case where the location of application data is pointed through an interactive channel, a secondary device (e.g., a mobile phone) directly accesses the URL of the application and receives and processes the application (see FIGS. 14 and 15).

Meanwhile, in the case where application data is transmitted through a broadcast channel, the digital broadcast receiver receives the application data and transmits the application data to the mobile phone or the like.

Figure 17:
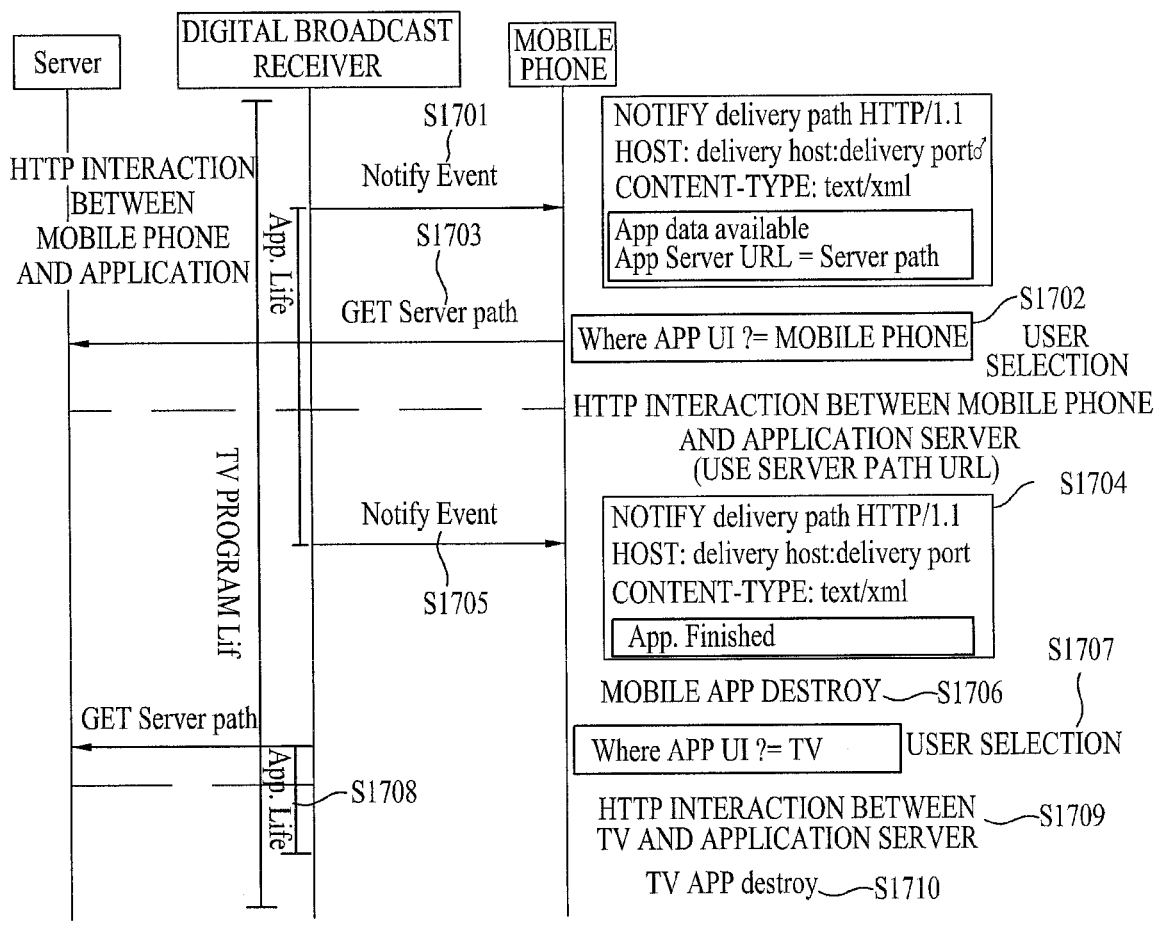
FIG. 17 is a flowchart illustrating step S505 of FIG. 5 and step S606 of FIG. 6 in detail.

FIG. 17 is a flowchart illustrating step S505 of FIG. 5 and step S606 of FIG. 6 in detail. As shown in FIG. 17, signal flow between the digital broadcast receiver and the secondary device (e.g., the mobile phone) is performed according to, for example, UPnP. In the UPnP protocol, the digital broadcast receiver may function as a device and the mobile phone may function as a Control Point (CP). In addition, an example of a message used in each step is shown on the right portion of FIG. 17.

As described above, the digital broadcast receiver already knows a URL able to receive application data through EPG metadata, an AIT multiplexed in broadcast A/V content, or the like.

The digital broadcast receiver according to one embodiment of the present invention transmits a "notify event" message to the mobile phone (S1701). If it is selected that an application is displayed on the mobile phone (S1702), the mobile phone transmits a "get server path" message to the server (S1703). The server may provide the application. Accordingly, HTTP interaction between the mobile phone and the server is performed (S1704).

The digital broadcast receiver transmits a new "notify event" message to the mobile phone (S1705). The application which was executed on the mobile phone is destroyed (S1706). It is assumed that the application life is finished. If it is selected that the application is displayed on the TV receiver (digital broadcast receiver) (S1707), the digital broadcast receiver transmits a "get server path" message to the server (S1708). Accordingly, HTTP interaction between the digital broadcast receiver and the server is performed (S1709). If the application life is finished, the application which was displayed on the digital broadcast receiver is destroyed (S1710).

In the case where the server shown in FIG. 17 uses only one application URL, an HTML page is designed to another type such that one HTML page is differently displayed according to the screen sizes of the digital broadcast receiver and the mobile phone.

In contrast, in the case where the server shown in FIG. 17 uses several application URLs according to devices, the digital broadcast receiver transmits URLs, in which HTML pages are coded with respect to every device, in a state of being included in a NOTIFY EVENT message.

Further, in the case where application data is transmitted through a broadcast channel, the digital broadcast receiver may directly transfer the received application data to the mobile phone. In this case, the received application may be transferred in a state of being carried in the body of the notify event message.

Figure 18:
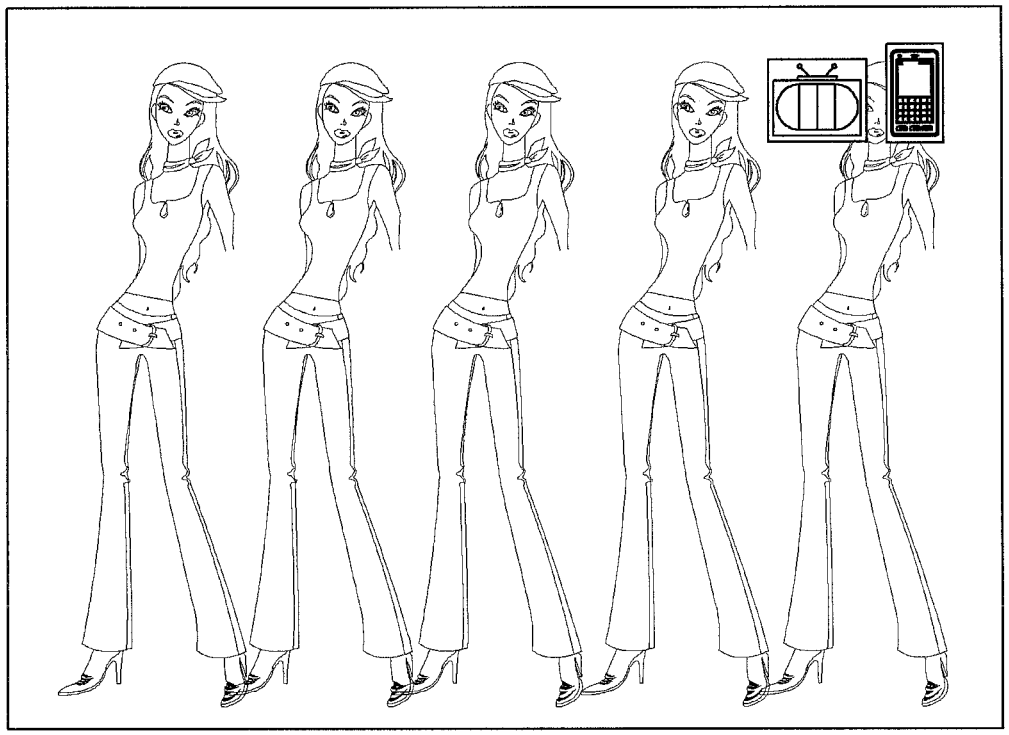
FIG. 18 is a diagram showing a UI screen according to an embodiment of the present invention.
Figure 19:
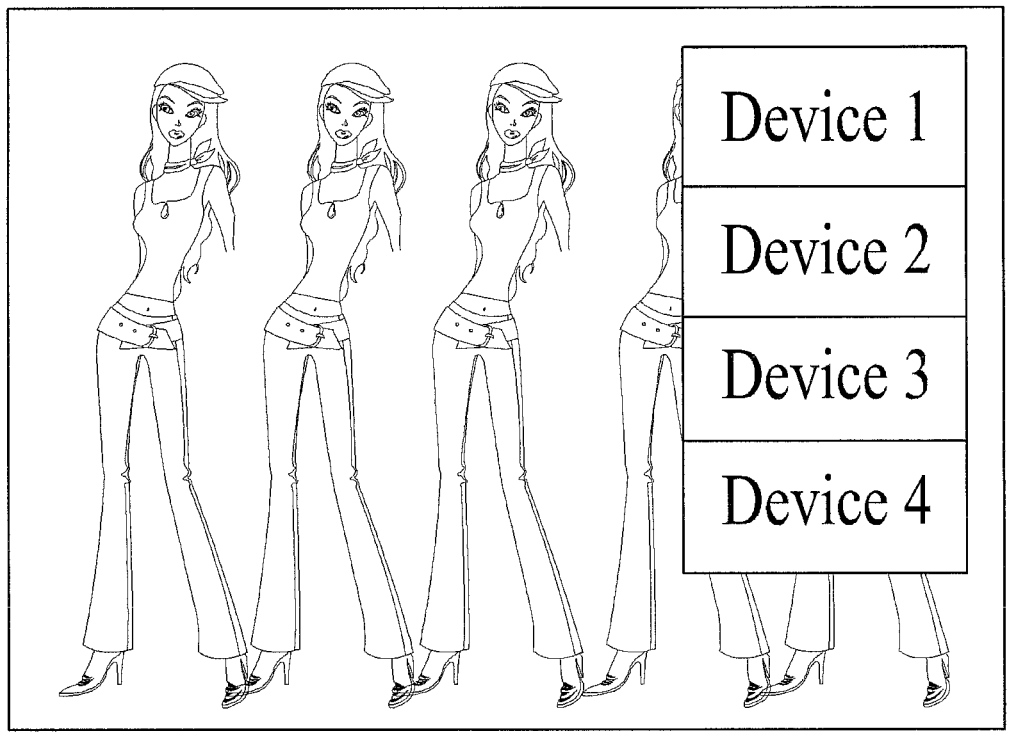
FIG. 19 is a diagram showing a UI screen according to another embodiment of the present invention.
Figure 20:
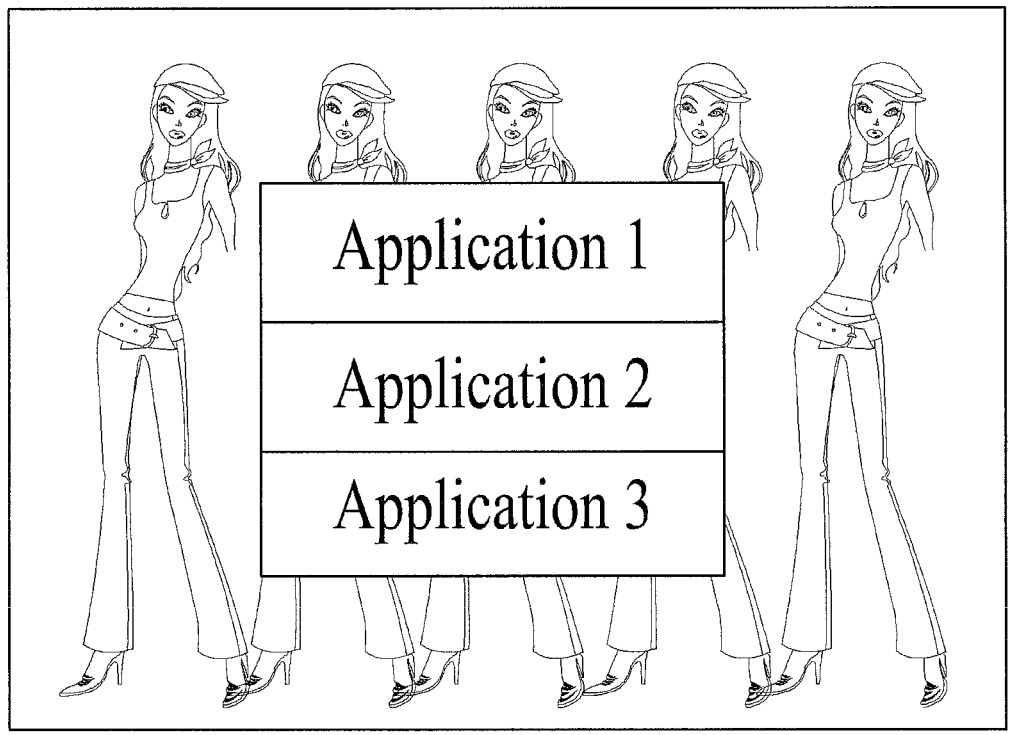
FIG. 20 is a diagram showing a UI screen according to another embodiment of the present invention.
Figure 21:
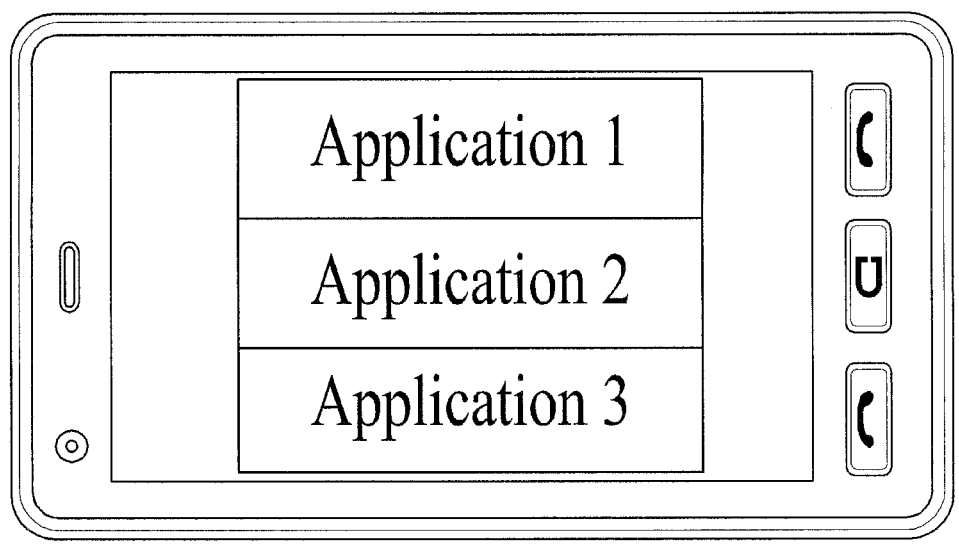
FIG. 21 is a diagram showing a UI screen according to another embodiment of the present invention.

FIG. 18 is a diagram showing a UI screen according to an embodiment of the present invention. FIG. 19 is a diagram showing a UI screen according to another embodiment of the present invention. FIG. 20 is a diagram showing a UI screen according to another embodiment of the present invention. FIG. 21 is a diagram showing a UI screen according to another embodiment of the present invention.

As shown in FIG. 18, an indicator informing that the application is available in the secondary device is displayed on the right upper portion of the digital broadcast receiver. This location is only exemplary. If the indicator shown in FIG. 18 is selected and a plurality of devices which can access the application is present, a device list is displayed as shown in FIG. 19. Representative images of the devices may be displayed together or names specified by a user may be displayed together.

Meanwhile, if a plurality of accessible applications is present, as shown in FIG. 20, an application list aligned according to priority or the like is displayed.

Further, unlike FIG. 20, FIG. 21 shows an embodiment in which an application list is displayed on a secondary device. In the case of FIG. 21, a problem that the broadcast A/V content is partially covered with the application list on the screen of the digital broadcast receiver can be solved. In addition, different applications can be displayed on a plurality of secondary devices. If a specific application is selected from the application list shown in FIG. 21, the selected application may be displayed on the digital broadcast receiver, instead of the secondary device.

Figure 22:
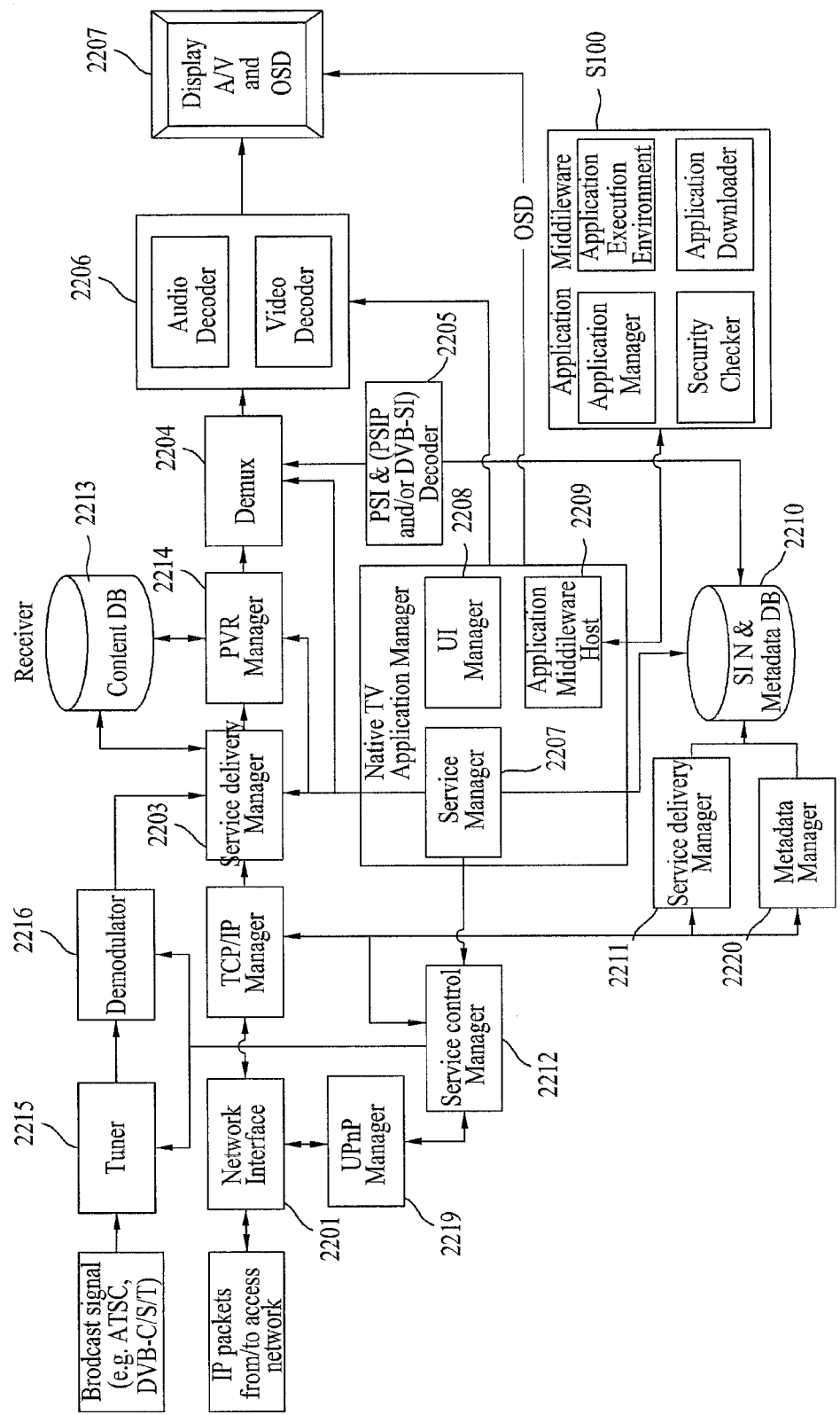
FIG. 22 is a diagram showing a digital broadcast receiver according to an embodiment of the present invention.

FIG. 22 is a diagram showing a digital broadcast receiver according to an embodiment of the present invention. That is, FIG. 22 is a block diagram showing a digital broadcast receiver connected to a secondary device (e.g., a mobile phone) over a network.

A network interface 2201 performs reception/transmission of IPTV packets, and performs as physical & data link layers.

An Internet Protocol (IP) manager 2202 is responsible for end to end (source to destination) packet delivery, and classifies each packet into an appropriate protocol manager.

A service delivery manager 2203 is responsible for handling real-time streaming data and downloading content, and is also responsible for retrieving content from the Content DB for later consumption. RTP/RTCP (Real-Time Transport Protocol/RTP Control Protocol) may be used with MPEG-2 TS.

MPEG-2 transport packets may be carried directly in UDP without RTP. For content download, HTTP or FLUTE may be used as a delivery protocol.

The service delivery manager 2203 is responsible for processing MPEG-2 TS received from a demodulator upon legacy TV reception. In this case, the service delivery manager is responsible for processing Non-AV data such as a data broadcast in TS or file transmission.

A DEMUX 2204 performs de-multiplexing of audio, video and PSI tables from input transport packets, controls the de-multiplexing for PSI tables by PSI Decoder, makes the sections of PSI tables and sending them to PSI Decoder, and controls de-multiplexing of A/V transport packets.

A PSI & (PSIP and/or DVB-SI) decoder 2205 may be a PSI (and PSIP/DVB-SI) Control Module. The PSI & (PSIP and/or DVB-SI) decoder 2205 sets PIDs for PSI tables and PSIP/DVB-SI tables to DEMUX, and performs decoding of the private sections of PSI and (PSIP and/or DVB-SI) sent by DEMUX. The decoding result is used to de-multiplex input transport packets. (e.g., set Audio and Video PID to DEMUX.)

An audio and video decoder 2206 performs decoding of audio and video elementary stream packets.

An A/V and OSD Display 2207 receives audio and video data from the A/V Decoder, controls video and audio data, displays the video and audio data on the Screen and speaker, and controls OSD (On Screen Display) Graphic data.

A native application manager and UI (User Interface) manager 2208 supports the Graphical User Interface on the TV Screen, receives a user key by remote control or front panel, and performs overall management of the TV system.

A service manager 2209 controls all the other managers related to services such as a service control manager, a service delivery manager, a service discovery manager, and a metadata manager, and is responsible for serving TV & IPTV services.

An SI & Metadata DB 2210 is a database for service discovery information and metadata related to the services.

An SD (Service Discovery) manager 2211 enables the discovery of IPTV services over a bi-directional IP network, and provides all the information for service selection.

The SD manager 2211 is responsible for processing information about a Legacy TV service in the case of a hybrid receiver able to perform legacy TV reception.

A service control manager 2212 is responsible for selecting and controlling services and managing sessions, selects live broadcasting services using IGMP or RTSP protocol, and selects VOD content using RTSP protocol. If using IMS, SIP protocol is used for initiating and managing sessions through an IMS Gateway. RTSP protocol can be used in controlling delivery of broadcast TV and audio as well as for on-demand delivery. RTSP protocol uses a persistent TCP connection and allows trick mode control for real-time media streaming.

The service control manager 2212 is responsible for controlling a tuner and a demodulator so as to control the existing DTV broadcast reception in the case of a hybrid receiver able to perform the existing legacy TV reception. The service control manger is responsible for controlling a UPnP manager for interlocking with another device on a home network.

A content DB 2213 is a database for content which may be delivered through a content download system or may be recorded from live media TV.

A Personal Video Recorder (PVR) manager 2214 is responsible for recording and playing live streaming content, and gathers all necessary metadata of the recorded content and generates additional information for improved user experience (e.g., thumbnail images, indexes, etc.).

The tuner 2215 receives terrestrial (or cable) digital TV signals, is controlled by a Channel Manager (CM), and reports the strength and result of receiving signals to the CM.

The demodulator 2216 performs 64 or 256 VSB demodulation (or 64/256 QAM demodulation in Cable).

An application middleware host 2217 is added to Host S/W in order to support Application Middleware and is responsible for adaptation.

An application middleware manager 2218 is a collection of management modules for managing application middleware and provides a function necessary for the life-cycle (installation, execution, management and deletion) of the application.

An application execution environment is provided so as to provide an executable environment of an application and examples thereof include a Java-based virtual machine, a web browser, or the like.

Interaction with the Application Middleware Host is performed in order to utilize the function (resource, UPnP function or the like) of the Host.

A UPnP manager 2219 manages a UPnP function (discovery, control, event notification, or the like) to interlock with another device on a home network.

In addition, a metadata manager 2220 is responsible for controlling or managing metadata stored in the SI & Metadata DB 2210.

Figure 23:
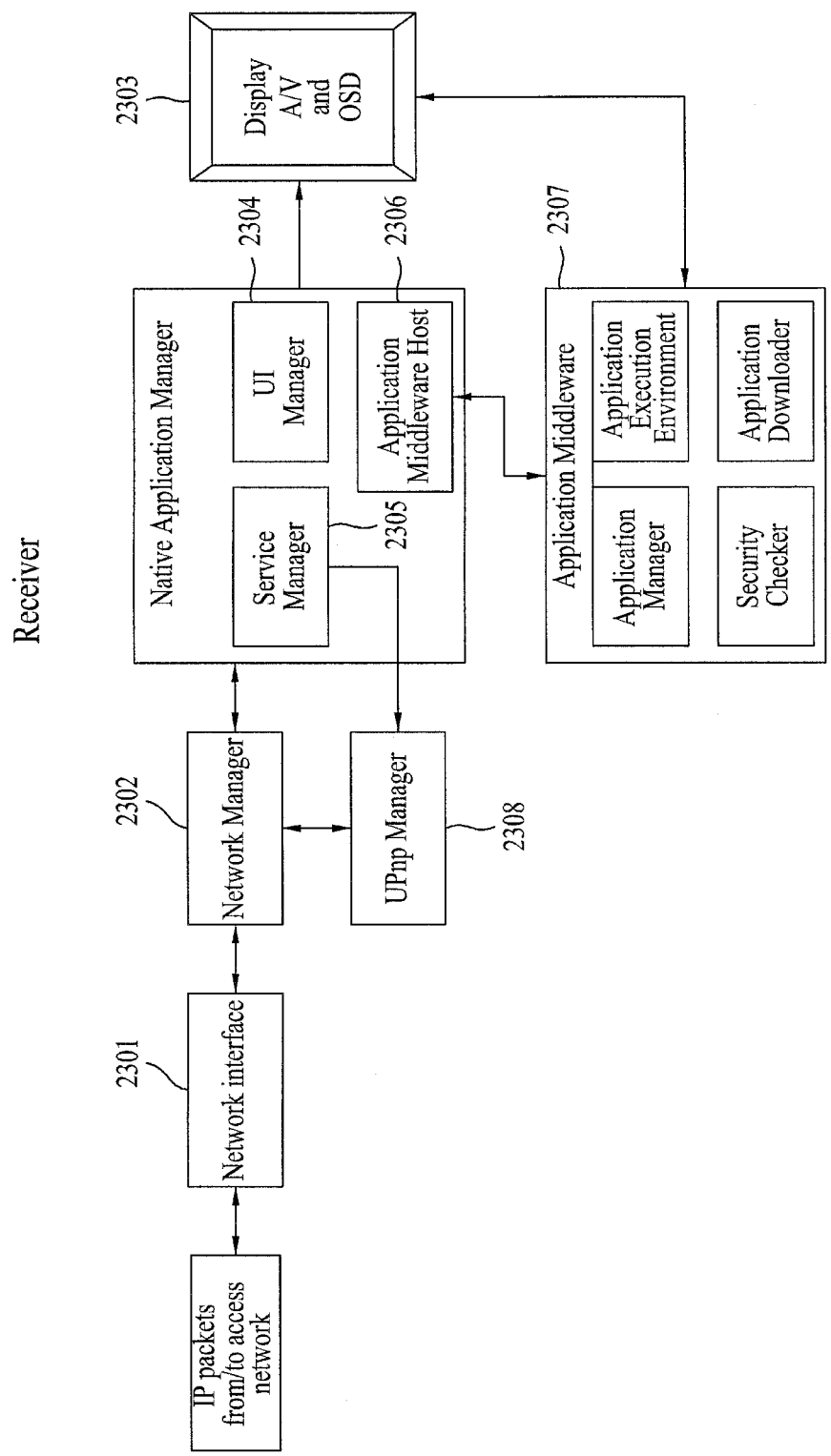
FIG. 23 is a diagram showing a secondary device according to an embodiment of the present invention.

FIG. 23 is a diagram showing a secondary device according to an embodiment of the present invention. FIG. 23 is a block diagram of a secondary device communicating with a digital broadcast receiver (e.g., a TV receiver) over a network.

A network interface 2301 performs reception/transmission of IP packets, and is physical & data link layers.

A network manager 2302 is responsible for end to end (source to destination) packet delivery, classifies each packet into an appropriate protocol manager, is responsible for handling real-time streaming data and downloading content, and is also responsible for retrieving content from the Content DB for later consumption.

RTP/RTCP (Real-Time Transport Protocol/RTP Control Protocol) may be used with MPEG-2 TS. MPEG-2 transport packets may be carried directly in UDP without RTP. For content downloading, HTTP or FLUTE protocol may be used for delivery protocol.

An A/V and OSD display 2303 receives audio and video data from A/V Decoder, controls video and audio data, displays video data on the screen and outputs audio data to speakers, and controls OSD (On Screen Display) Graphic data.

A native application manager and UI (User Interface) manager 2304 supports the Graphical User Interface on the device screen, receives a user key by remote control or front panel, and performs overall management of the device system.

A service manager 2305 controls all the other managers related to the services, and is responsible for serving mobile device services. The Service Manager is responsible for controlling a UPnP manager in interlock with another device on a home network.

An application middleware host 2306 is added to host S/W in order to support application middleware and is responsible for adaptation.

An application middleware manager 2307 is a collection of management modules for managing application middleware and provides a function necessary for the life-cycle (installation, execution, management and deletion) of the application.

An application execution environment is provided so as to provide an executable environment of an application and examples thereof include a Java-based virtual machine, a web browser, or the like.

Interaction with the Application Middleware Host is performed in order to utilize the function (resource, UPnP function or the like) of the host.

A UPnP manager 2308 manages a UPnP function (discovery, control, event notification, or the like) to interlock with another device on a home network.

Figure 24:
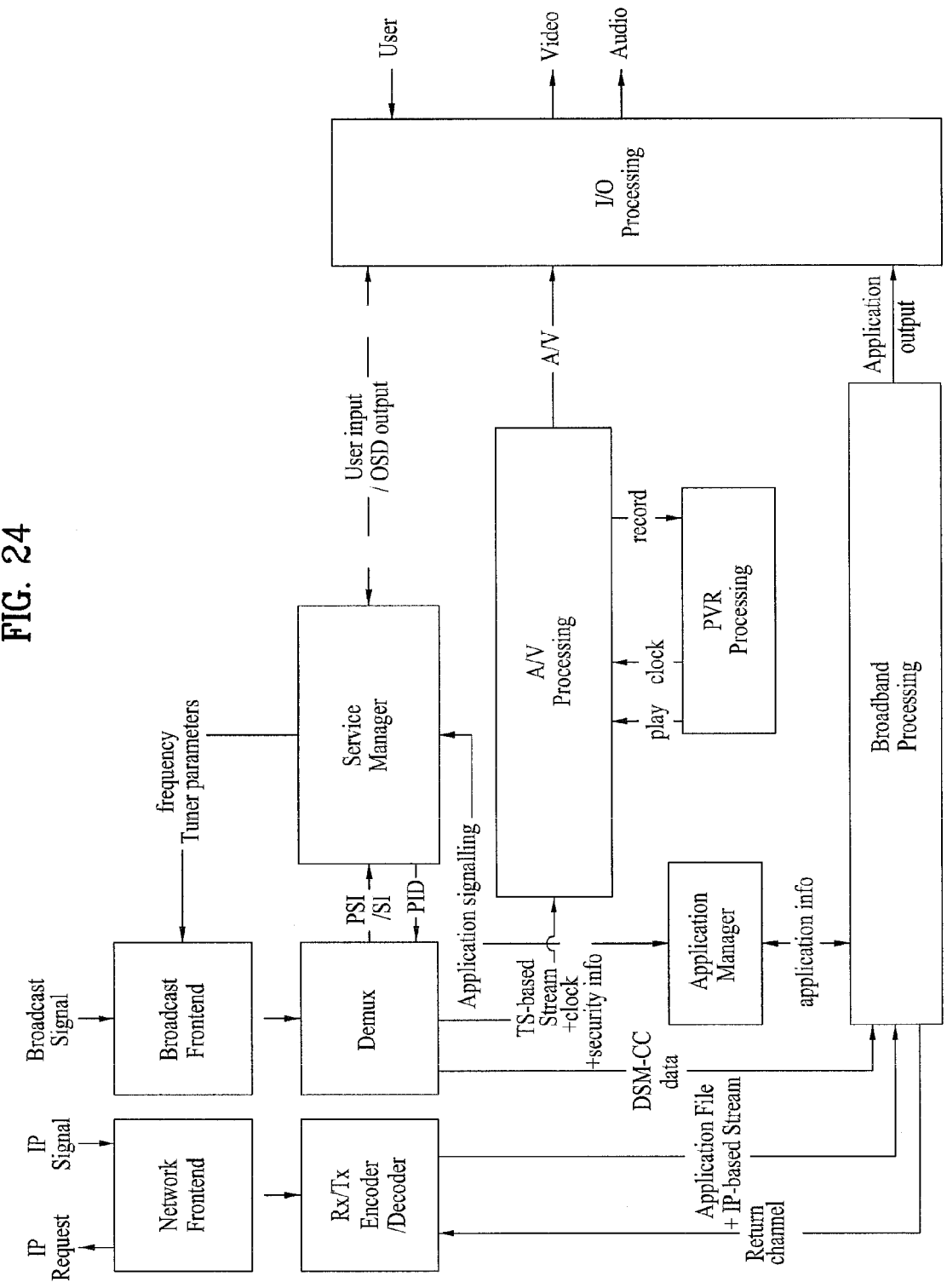
FIG. 24 is a diagram showing a digital broadcast receiver according to another embodiment of the present invention.

FIG. 24 is a diagram showing a digital broadcast receiver according to another embodiment of the present invention. As shown in FIG. 24, the digital broadcast receiver according to another embodiment of the present invention includes a network frontend 2401, a broadcast frontend 2402, a TCP/IP decoder 2403, a system decoder 2404, a service manager 2405, an A/V processing 2406, an application manager 2407, a PVR processing module 2408, a broadband processing module 2409, and an I/O processing module 2410.

The network frontend 2401 receives IP data requested by the broadband processing module 2409 or transmits response information of the digital broadcast receiver to a specific IP address.

The broadcast frontend 2402 receives a broadcast signal according to a frequency and a tuning parameter set by the service manager 2405, suitably decodes the broadcast signal according to a transmission method, and outputs a TS.

The TCP/IP decoder 2403 decodes an IP signal and sends the decoded signal to the broadband processing module 2409.

The system decoder 2404 receives packets from the service manager 2405 according to PID information, decodes the packets, and outputs signaling section information or A/V/data packets. The signaling section information is transferred to the service manager 2405, the A/V packets are transferred to the A/V processing module 2406, and the data (DSM-CC) packets are transferred to the broadband processing module 2409.

The service manager 2405 is responsible for controlling all services provided by a service provider. Based on PSI/SI information, an entire service is controlled according to a service list and access information. In addition, tuner control information, such as a frequency or a guard interval, which is transferred through the PSI/SI information, is controlled, and a service-associated process (e.g., channel switching) of an EPG and channel-associated user input is performed.

The A/V processing module 2406 decodes an A/V stream, scrambles the A/V stream, and synchronously transmits the scrambled A/V stream to the I/O processing module 2410.

The application manager 2407 retrieves data from an associated IP address according to application signaling information transferred from the service manager 2405, selects an application loaded/executed by the broadband processing module 2409, and manages a life cycle.

The PVR processing module 2408 is responsible for performing a function linked with a PVR (Digital Video Recorder (DVR)), and, for example, is responsible for controlling stream storage and reproduction. Upon stream recording, an A/V stream to which information such as a timestamp and a random access point is added is stored, and, upon stream reproduction, the A/V stream is transferred to the A/V decoder along with the information such as the timestamp and random access point.

The broadband processing module 2409 decodes packets transmitted using a TCP/IP protocol according to an encoded protocol, processes the decoded packets, and transfers the processed packets to the I/O processing module 2410.

The I/O processing module 2410 is associated with a user input and an A/V output, is responsible for processing the user input and controlling an EPG and an OSD, and performs audio and video output.

Figure 25:
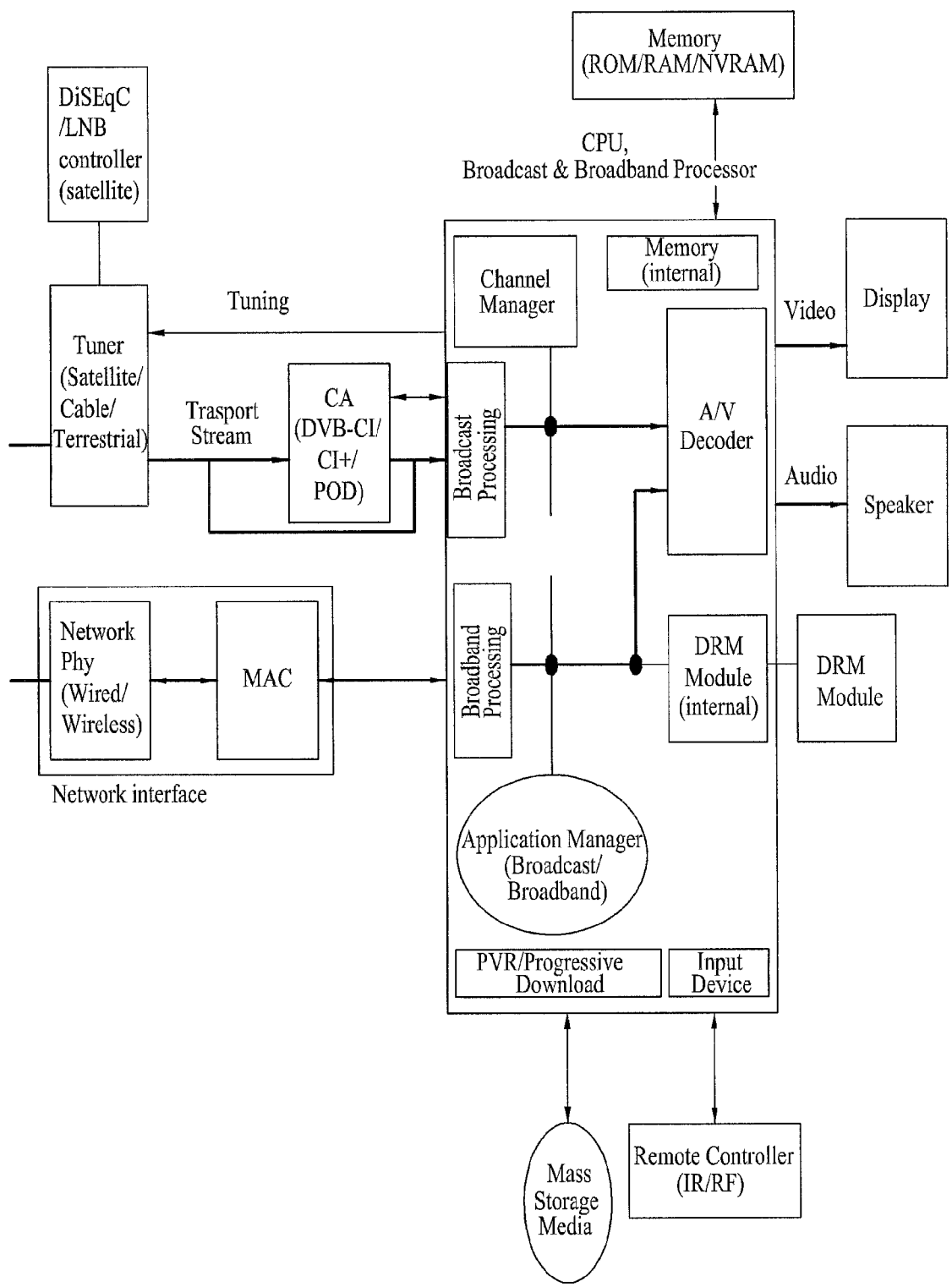
FIG. 25 is a diagram showing a digital broadcast receiver according to another embodiment of the present invention.

FIG. 25 is a diagram showing a digital broadcast receiver according to another embodiment of the present invention. As shown in FIG. 25, the digital broadcast receiver according to another embodiment of the present invention includes a tuner 2501, a DiSEqC/LNB controller 2502, a CA 2503, a Network Phy 2504, a MAC 2505, a memory 2506, a display 2507, a speaker 2508, mass storage media 2509, a remote controller 2510, a CPU, a broadcast & broadband processor 2511.

The tuner 2501 receives a broadcast signal according to a predetermined frequency and tuning parameter.

The DiSEqC/LNB controller 2502 sets and controls a reception frequency and parameter of an antenna for receiving a satellite broadcast by a satellite broadcast receiver.

The CA 2503 refers to a condition access module and performs various processes according to a predetermined condition, such as descrambling of scrambled stream according to predetermined authority.

The Network Phy 2504 is an interface for accessing an Internet network.

The MAC 2505 receives a signal transmitted through the Internet network.

The memory 2506 stores an initial booting code (e.g., a ROM), is used as a main memory for performing various operations (e.g., a RAM), and stores non-volatile information necessary for operating a TV receiver (e.g., a NVRAM).

The display 2507 outputs video information.

The speaker 2508 outputs audio information.

The mass storage media 2509 are spaces for performing a PVR function such as a HDD and storing high-capacity media/files.

The remote controller 2510 is a main interface for controlling a TV receiver.

The CPU, broadcast & broadband processor 2511 may correspond to a main DTV chipset and may include a CPU and a decoder. In addition, the CPU, broadcast & broadband processor may further include the following modules.

A channel manager 2520 stores/loads channel information and controls a peripheral device.

A memory (internal) 2521 is a low-capacity memory for debugging and system management.

A broadcast processing module 2522 receives a broadcast stream.

A broadcast processing module 2523 receives Internet packets.

An A/V decoder 2524 decodes audio/video packets and transmits the decoded audio/video packets to an output module.

A DRM module 2525 decodes copy protection information of an input stream according to authentication information.

An application manager 2526 manages a data/Internet service application.

A PVR/Progressive Download module 2527 is a high-capacity external device controller and is, for example, linked with time shift, recording and an input/output process of downloaded content.

An input device 2528 processes an input signal of an external device, for example, a remote controller.

In FIGS. 1 to 25, since linked applications are grouped so as to be signaled, applications linked with a currently loaded application are downloaded in advance and thus an access rate is significantly improved. In addition, since a linked list is displayed on a screen, a customized UI can be provided to a user.

Although those skilled in the art can implement the present invention through the above description, the present invention will be described in summary again as follows.

Figure 26:
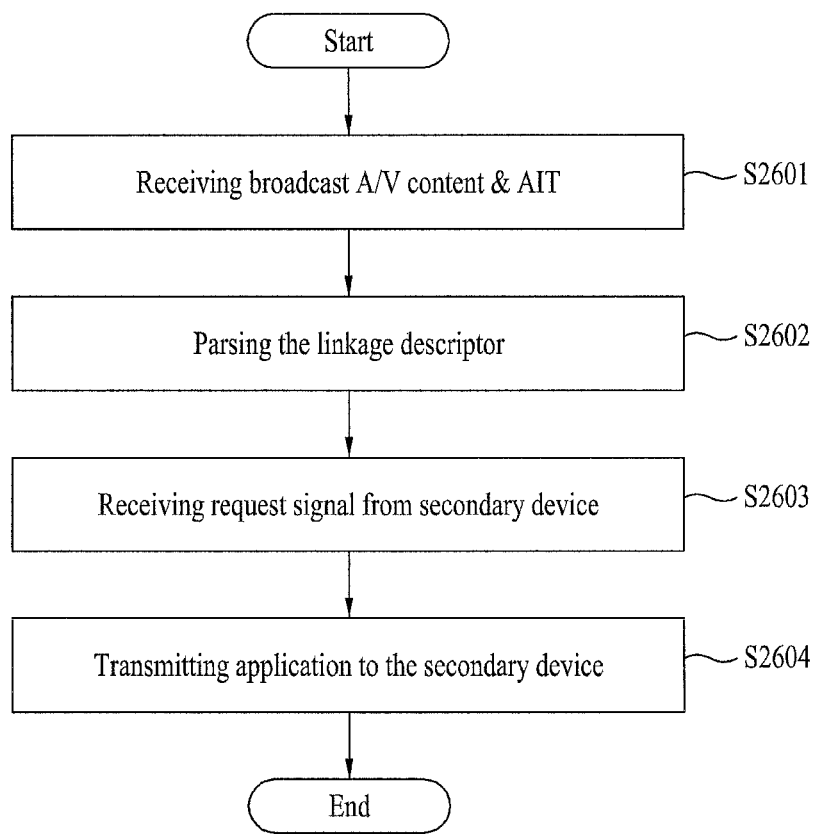
FIG. 26 is a flowchart illustrating a control method according to an embodiment of the present invention in summary.

FIG. 26 is a flowchart illustrating a control method of a digital broadcast receiver according to an embodiment of the present invention in summary.

As shown in FIG. 26, the digital broadcast receiver according to one embodiment of the present invention receives, from a broadcast network, broadcast audio/video (A/V) content and application information table (AIT) data (S2601). At this time, the AIT data includes a linkage descriptor. The digital broadcast receiver is connected with an interactive network (e.g., Internet), as shown in FIGS. 22, 24, and 25.

The digital broadcast receiver parses the linkage descriptor (S2602). At this time, the linkage descriptor includes a field identifying a type of at least one secondary device able to process the application. Further, the digital broadcast receiver receives a request signal from the secondary device (S2603). The digital broadcast receiver transmits the application to the secondary device (S2604).

Meanwhile, the linkage descriptor can be understood by referring to FIG. 9, and the field may correspond to the target_device_profile field shown in FIG. 9.

Further, the application may be defined as a collection of documents consisting of an interactive service and the documents correspond to at least one of HTML (hypertext markup language), JavaScript, CSS (cascading style sheet), XML (extensible markup language) or multimedia files.

Figure 27:
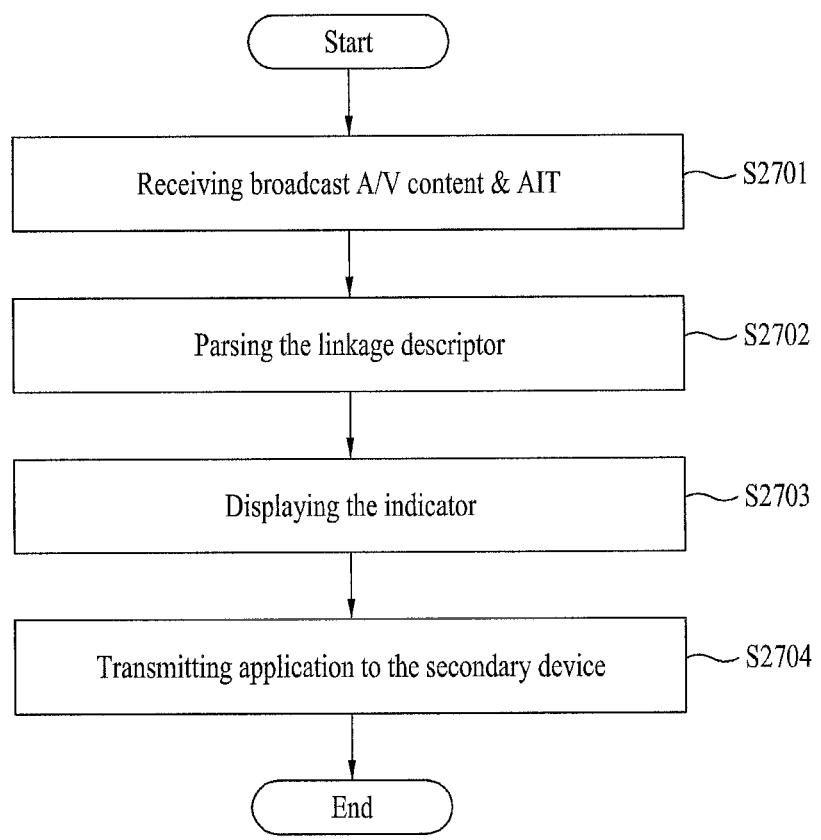
FIG. 27 is a flowchart illustrating a control method according to another embodiment of the present invention in summary.

FIG. 27 is a flowchart illustrating a control method of a digital broadcast receiver according to another embodiment of the present invention in summary.

As shown in FIG. 27, the digital broadcast receiver according to another embodiment of the present invention receives, from a broadcast network, broadcast audio/video (A/V) content and application information table (AIT) data (S2701). At this time, the AIT data includes a linkage descriptor. The digital broadcast receiver parses the linkage descriptor (S2702). At this time, the linkage descriptor includes a field identifying a type of at least one secondary device able to process the application. The digital broadcast receiver displays an indicator informing that the application is able to be accessed by using at least one secondary device (S2703). In addition, the digital broadcast receiver transmits the application to the secondary device (S2704).

Meanwhile, although not shown in FIG. 27, according to another embodiment of the present invention, the digital broadcast receiver may further perform the steps of searching at least one third device connected to the digital broadcast receiver, registering a type of the at least one third device in a memory, comparing the type of the secondary device with the type of the third device, and displaying the indicator if the type of the third device corresponds to the type of the secondary device.

Accordingly, data according to the present invention can be restrictively provided to only the third device which is registered in advance.

Further, the step of registering further registers a representative image mapped with the type of the at least one third device in the memory.

In addition, the linkage descriptor further includes an additional field identifying the number of the at least one secondary device processing the application simultaneously. The additional field may correspond to the "number_of_concurrent_instance" field shown in FIG. 9.

As described above, a network connection between the digital broadcast receiver and the secondary device is performed based on UPnP (Universal Plug and Play) protocol.

Although not shown in FIG. 27, according to another embodiment of the present invention, the digital broadcast receiver may further perform the steps of determining whether there are multiple applications able to be accessed by using at least one secondary device, and transmitting a list identifying the multiple applications to the secondary device.

Figure 28:
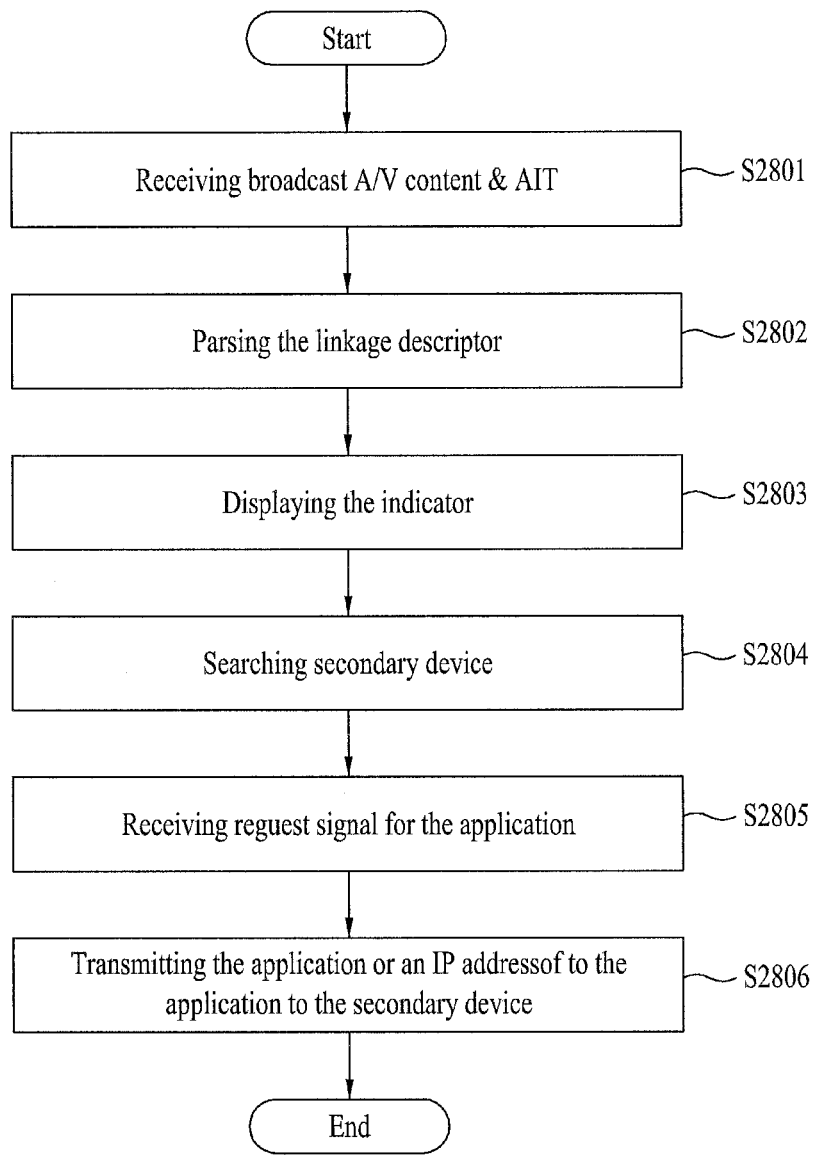
FIG. 28 is a flowchart illustrating a control method according to another embodiment of the present invention in summary.

FIG. 28 is a flowchart illustrating a control method according to another embodiment of the present invention in summary. Hereinafter, a control method according to another embodiment of the present invention will be described with reference to FIG. 28.

As shown in FIG. 28, the digital broadcast receiver according to one embodiment of the present invention receives, from a broadcast network, broadcast audio/video (A/V) content and application information table (AIT) data (S2801). At this time, the AIT data includes a linkage descriptor. The digital broadcast receiver is, for example, connected with an interactive network.

The digital broadcast receiver parses the linkage descriptor (S2802). At this time, the linkage descriptor includes a field identifying a type of at least one secondary device able to process the application.

The digital broadcast receiver displays an indicator informing that the application is able to be accessed by using at least one secondary device (S2803).

The digital broadcast receiver searches at least one secondary device connected to the digital broadcast receiver (S2804). In addition, the digital broadcast receiver receives a request signal for the application (S2805). In addition, the digital broadcast receiver transmits the application or an IP address of the application to the secondary device (S2806).

Meanwhile, although not shown in FIG. 28, the control method of the digital broadcast receiver according to another embodiment of the present invention may selectively add the step of registering a type of the at least one secondary device in a memory, displaying a first list identifying multiple secondary devices, displaying a second list identifying multiple applications, receiving an additional request signal for the second list from the secondary device, and transmitting the second list to the secondary device in response to the additional request signal, between steps of S2804 and S2805.

FIG. 29 is a diagram showing an example of a UI displayed in a process of implementing another embodiment of the present invention shown in FIG. 28. The first list identifying multiple secondary devices may be displayed as shown in FIG. 29. For example, a specific application is first confirmed and then secondary devices able to process the specific application are displayed. Further, time required for receiving the specific application and sensitivity of each display are displayed so as to broaden the width of selection of the user. The device list displayed in FIG. 29 may be directly displayed on the screen of the digital broadcast receiver or may be displayed on the screen of each device.

Figure 30:
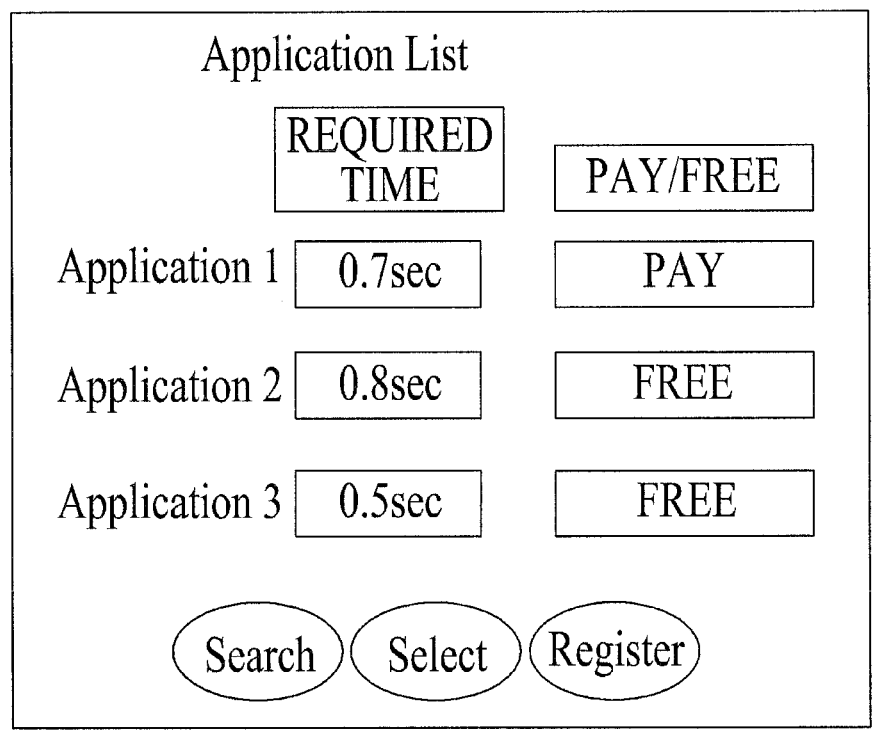
FIG. 30 is a diagram showing another example of a UI displayed in a process of implementing another embodiment of the present invention shown in FIG. 28.

FIG. 30 is a diagram showing another example of a UI displayed in a process of implementing another embodiment of the present invention shown in FIG. 28. The second list identifying multiple secondary devices may be displayed as shown in FIG. 30. For example, a specific device is first confirmed and then currently downloadable applications are displayed. Further, time required for downloading applications by the specific device and an item for identifying pay/free are displayed so as to broaden the width of selection of the user. The application list displayed in FIG. 30 may be directly displayed on the screen of the digital broadcast receiver or may be displayed on the screen of each device.

Figure 31:
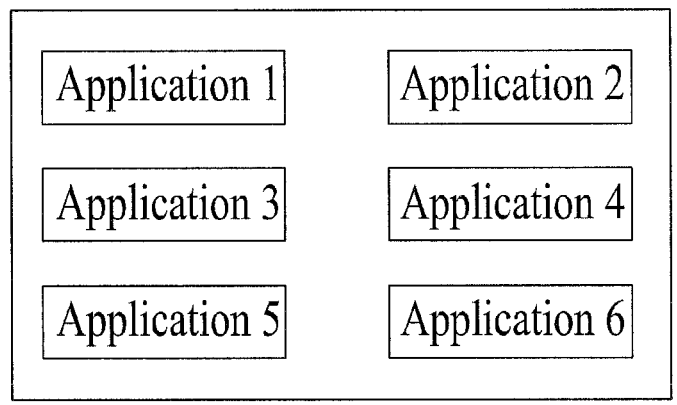
FIG. 31 is a diagram showing another example of a UI displayed in a process of implementing another embodiment of the present invention shown in FIG. 28.

FIG. 31 is a diagram showing another example of a UI displayed in a process of implementing another embodiment of the present invention shown in FIG. 28. As shown in FIG. 31, available applications may be designed to be displayed at once. More particularly, only applications available in a specific device may be selected from the applications so as to be highlighted.

FIG. 32 is a diagram showing another example of a UI displayed in a process of implementing another embodiment of the present invention shown in FIG. 28. As shown in FIG. 32, in one embodiment of the present invention, a plurality of applications and a plurality of devices are displayed in the form of a map. More particularly, applications able to be processed by each device and applications unable to be processed by each device are displayed so as to be distinguished from each other. Accordingly, the user may easily select a device able to process a desired application or select a device able to process a greatest number of applications.

Further, the application is defined as a collection of documents consisting of an interactive service and the documents correspond to at least one of HTML (hypertext markup language), JavaScript, CSS (cascading style sheet), XML (extensible markup language) or multimedia files.

In addition, the linkage descriptor further includes an additional field identifying the number of the at least one secondary device processing the application simultaneously. The linkage descriptor was described above and thus a description thereof will be omitted herein.

Further, for example, a network connection between the digital broadcast receiver and the secondary device is performed based on UPnP (Universal Plug and Play) protocol.

Further, the digital broadcast receiver according to one embodiment of the present invention includes a first receiving module, a parsing module, a display module, a search module, a second receiving module, and a transmitting module.

The first receiving module receives, from a broadcast network, broadcast audio/video (A/V) content and application information table (AIT) data, wherein the AIT data includes a linkage descriptor.

The same function may be designed to be performed by the tuner 2215 of FIG. 22.

The parsing module parses the linkage descriptor, wherein the linkage descriptor comprises a field identifying a type of at least one secondary device able to process the application.

The same function may be designed to be performed by the PSI decoder 2205 of FIG. 22.

The display module displays an indicator informing that the application is able to be accessed by using at least one secondary device.

The same function may be designed to be performed by the Display A/V and OSD 2207 of FIG. 22.

The search module searches at least one secondary device connected to the digital broadcast receiver.

The same function may be designed to be performed by the native TV application manager of FIG. 22 or a separate module.

The second receiving module receives a request signal for the application.

The same function may be designed to be performed by the UI manager 2208 of FIG. 22.

The transmitting module transmits the application or an IP address of the application to the secondary device.

The same function may be designed to be performed by the network interface 2201 of FIG. 22.

Although a description has been given according to the drawings, other inventions may be implemented by a combination of the features of the present invention shown in the drawings. Further, description of the method and the description of the device may be supplementarily analyzed.

The method according to the present invention is implemented in the form of a program command performed through various computer means so as to be recorded on a computer-readable medium. The computer-readable medium may include a program command, a data file, a data structure, or a combination thereof. The program command recorded on the medium may be specially designed and constructed for the present invention or may be known to and used by those skilled in computer software. Examples of the computer-readable recording medium include magnetic media such as a hard disk, a floppy disk or a magnetic tape, optical media such as a CD-ROM or a DVD, magneto-optical media such as a floptical disk, and a hardware device specially constructed to store and perform a program command, such as a ROM, a RAM or a flash memory. Examples of the program command include machine code generated by a compiler and a high-level language code executed by a computer using an interpreter. The hardware device may be constructed to be operated as one or more software modules in order to perform the operation of the present invention, and vice versa. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR CARRYING OUT THE INVENTION

Various embodiments have been described in the best mode for carrying out the invention.

INDUSTRIAL APPLICABILITY

As described above, the present invention is wholly or partially applicable to a digital broadcast system.

What is claimed is:

1. A method of processing an application in a digital broadcast receiver the method comprising:
   receiving, from a broadcast network, broadcast audio/video (A/V) content and application information table (AIT) data, wherein the AIT data includes a linkage descriptor;
   parsing the linkage descriptor, wherein the linkage descriptor comprises a field identifying a type of at least one secondary device able to process the application;
   displaying an indicator to indicate presence of at least one application usable in at least one of a plurality of secondary devices while displaying video data included in the broadcast A/V content, wherein the indicator is overlaid with the video data;
   searching a specific secondary device coupled to the digital broadcast receiver, wherein identification for the specific secondary device is registered in a memory of the digital broadcast receiver;
   extracting additional information on multiple applications;
   displaying an application list according to the extracted additional information, wherein the application list comprises at least one of time information for downloading the applications or price information;
   receiving a request signal for a specific application in the application list from the specific secondary device; and
   transmitting the requested application or an IP address of the requested application to the specific secondary device.

2. The method of claim 1, further comprising registering a type of the specific secondary device in the memory.

3. The method of claim 1, wherein the application includes a collection of documents corresponding to an interactive service and documents corresponding to at least one of HTML (hypertext markup language), JavaScript, CSS (cascading style sheet), XML (extensible markup language) or multimedia files.

4. The method of claim 1, wherein the linkage descriptor further comprises an additional field identifying a number of secondary devices processing the application simultaneously.

5. The method of claim 1, wherein a network connection between the digital broadcast receiver and the specific secondary device is based on UPnP (Universal Plug and Play).

6. A digital broadcast receiver comprising:
- a first receiver to receive, from a broadcast network, broadcast audio/video (A/V) content and application information table (AIT) data;
- a parser to parse a linkage descriptor, wherein the linkage descriptor comprises a field identifying a type of at least one secondary device able to process the application;
- a display to display an indicator informing that there is at least one application usable in at least one of a plurality of secondary devices while displaying video data included in the broadcast A/V content, wherein the indicator is overlaid with the video data;
- a search processor to search a specific secondary device coupled to the digital broadcast receiver, wherein identification for the specific secondary device is registered in a memory of the digital broadcast receiver;
- a controller to extract additional information on multiple applications and to control the display to display an application list according to the extracted additional information, wherein the application list comprises at least one of time information for downloading the applications or price information;
- a second receiver to receive a request signal for a specific application in the application list from the specific secondary device; and
- a transmitter to transmit the requested application or an IP address of the requested application to the specific secondary device.

7. The digital broadcast receiver of claim 6, wherein the controller further registers a type of the specific secondary device in a memory.

8. The digital broadcast receiver of claim 6, wherein the application includes a collection of documents corresponding to an interactive service and documents corresponding to at least one of HTML (hypertext markup language), JavaScript, CSS (cascading style sheet), XML (extensible markup language) or multimedia files.

9. The digital broadcast receiver of claim 6, wherein a network connection between the digital broadcast receiver and the specific secondary device is based on UPnP (Universal Plug and Play).

* * * * *